United States Patent
Um et al.

(10) Patent No.: US 12,214,775 B2
(45) Date of Patent: Feb. 4, 2025

(54) ROAD SURFACE RECOGNITION APPARATUS, VEHICLE HAVING THE SAME, AND METHOD OF CONTROLLING VEHICLE

(71) Applicants: HYUNDAI MOTOR COMPANY, Seoul (KR); KIA CORPORATION, Seoul (KR); Industry-University Cooperation Foundation Hanyang University (IUCF-HYU), Seoul (KR)

(72) Inventors: Ik Jin Um, Busan (KR); Jun Han Kang, Seoul (KR); Jungho Park, Incheon (KR); Man Dong Kim, Hwaseong-si (KR); Chung Choo Chung, Seoul (KR); Seung-Hi Lee, Seongnam-si (KR); Dae Jung Kim, Seoul (KR); Jin Sung Kim, Seoul (KR)

(73) Assignees: Hyundai Motor Company, Seoul (KR); Kia Corporation, Seoul (KR); Industry-University Cooperation Foundation Hanyang University (IUCF-HYU), Seoul (KR)

( * ) Notice: Subject to any disclaimer, the term of this patent is extended or adjusted under 35 U.S.C. 154(b) by 824 days.

(21) Appl. No.: 17/386,031

(22) Filed: Jul. 27, 2021

(65) Prior Publication Data
US 2022/0080952 A1   Mar. 17, 2022

(30) Foreign Application Priority Data
Sep. 11, 2020   (KR) .................. 10-2020-0116952

(51) Int. Cl.
  *B60W 30/02*   (2012.01)
  *B60W 10/06*   (2006.01)
  (Continued)

(52) U.S. Cl.
  CPC ............ *B60W 30/02* (2013.01); *B60W 10/06* (2013.01); *B60W 10/18* (2013.01);
  (Continued)

(58) Field of Classification Search
  CPC ...... B60W 30/02; B60W 10/06; B60W 10/18; B60W 30/18172; B60W 2552/40; G01B 17/08
  See application file for complete search history.

(56) References Cited

U.S. PATENT DOCUMENTS

| 4,651,290 A | 3/1987 | Masaki et al. |
| 4,690,553 A | 9/1987 | Fukamizu et al. |

(Continued)

FOREIGN PATENT DOCUMENTS

| CN | 107253482 A | * 10/2017 | ............ B60W 40/06 |
| CN | 105740793 B | * 12/2019 | ............... G01H 1/00 |

(Continued)

OTHER PUBLICATIONS

G. Magallan, et al., "Maximization of the Traction Forces in a 2WD Electric Vehicle," IEEE Transactions on Vehicular Technology, vol. 60, No. 2, Feb. 2011,, pp. 369-380.

(Continued)

*Primary Examiner* — Natalie Huls
*Assistant Examiner* — Nyla Gavia
(74) *Attorney, Agent, or Firm* — Morgan, Lewis & Bockius LLP

(57) ABSTRACT

A vehicle having a road surface recognition apparatus, may perform obtaining, by a controller, sound data for a sound detected by a sound detector while driving; obtaining, by the controller, driving data for driving information detected by a driving information detector; recognizing, by the controller, a type of road surface based on the obtained sound data and the obtained driving data; and controlling, by the (Continued)

controller, a traction control system based on information related to the recognized type of the road surface.

13 Claims, 29 Drawing Sheets

(51) Int. Cl.
*B60W 10/18* (2012.01)
*B60W 30/18* (2012.01)
*G01B 17/08* (2006.01)

(52) U.S. Cl.
CPC ....... *B60W 30/18172* (2013.01); *G01B 17/08* (2013.01); *B60W 2420/54* (2013.01); *B60W 2520/06* (2013.01); *B60W 2520/10* (2013.01); *B60W 2520/105* (2013.01); *B60W 2520/125* (2013.01); *B60W 2520/14* (2013.01); *B60W 2520/28* (2013.01); *B60W 2552/35* (2020.02); *B60W 2552/40* (2020.02); *B60W 2555/20* (2020.02); *B60W 2710/06* (2013.01); *B60W 2710/18* (2013.01)

(56) References Cited

U.S. PATENT DOCUMENTS

| | | | | |
|---|---|---|---|---|
| 6,095,945 | A * | 8/2000 | Graf | B60W 30/1819 477/118 |
| 2004/0138831 | A1* | 7/2004 | Watanabe | B60T 8/1725 702/33 |
| 2009/0115246 | A1 | 5/2009 | Yanagida et al. | |

FOREIGN PATENT DOCUMENTS

| | | | | |
|---|---|---|---|---|
| EP | 2343522 | A1 * | 7/2011 | ............ B60T 8/172 |
| JP | 7193927 | B2 * | 12/2022 | |
| KR | 20090047249 | A * | 5/2009 | ............ B60W 40/06 |
| KR | 10-2010-0136707 | A | 12/2010 | |
| KR | 10-2011-0135242 | A | 12/2011 | |
| KR | 10-1342771 | B1 | 12/2013 | |
| KR | 10-2014-0104565 | A | 8/2014 | |
| KR | 10-2014-0145528 | A | 12/2014 | |
| KR | 10-2017-0052770 | A | 5/2017 | |
| KR | 10-2018-0037468 | A | 4/2018 | |
| KR | 10-2018-0096235 | A | 8/2018 | |
| KR | 10-1936769 | B1 | 1/2019 | |

OTHER PUBLICATIONS

J. Alonso, et al., "On-board wet road surface identification using tyre/road noise and Support Vector Machines," Applied Acoustics, vol. 76, 2014, pp. 407-415.

H. Sado, et al., "Road Condition Estimation for Traction Control in Electric Vehicle," Dept. of Electrical Engineering, The University of Tokyo, IEEE, 1999, pp. 973-978.

M. Jokela, et al., "Road Condition Monitoring System Based on a Stereo Camera," IEEE, 2009, pp. 423-428.

J. Masino, et al., "Road surface prediction from acoustical measurements in the tire cavity using support vector machine," Applied Acoustics, vol. 125, 2017, pp. 41-48.

F. Gustafsson, "Slip-Based Tire-Road Friction Estimation," Dept. of Electrical Engineering, Linkoping University, Nov. 28, 1996, pp. 1-29.

* cited by examiner

<Dry asphalt>

<Icy>

<Mud>

<Sand>

<Dry asphalt>

<Mud>

<Sand>

FIG. 10

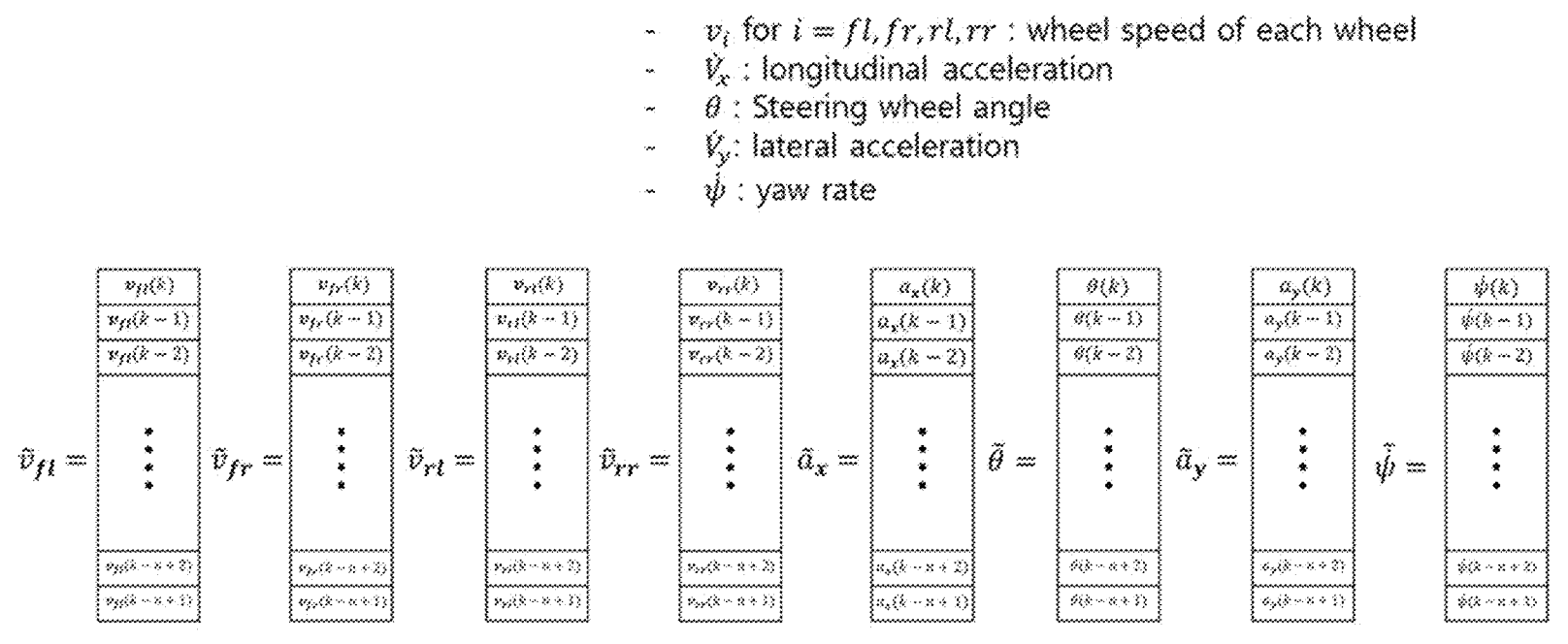

$v_i$ for $i = fl, fr, rl, rr$ : wheel speed of each wheel
$\tilde{v}_x$ : longitudinal acceleration
$\theta$ : Steering wheel angle
$\tilde{v}_y$ : lateral acceleration
$\dot{\psi}$ : yaw rate $\tilde{v}_{fl} = $
$\tilde{v}_{fr} = $
$\tilde{v}_{rl} = $
$\tilde{v}_{rr} = $
$\tilde{a}_x = $
$\tilde{\theta} = $
$\tilde{a}_y = $
$\tilde{\dot{\psi}} = $

Dry road

Mud road

Sand road

Icy road

ROAD SURFACE RECOGNITION APPARATUS, VEHICLE HAVING THE SAME, AND METHOD OF CONTROLLING VEHICLE

CROSS-REFERENCE TO RELATED APPLICATION(S)

The present application claims priority to Korean Patent Application No. 10-2020-0116952, filed on Sep. 11, 2020, the entire contents of which is incorporated herein for all purposes by this reference.

BACKGROUND OF THE INVENTION

Field of the Invention

The present invention relates to a road surface recognition apparatus that recognizes a type of road surface for driving control, a vehicle having the same, and a method of controlling the vehicle.

Description of Related Art

Recently, various safety and convenience systems such as an Anti-lock Brake System (ABS), an Electronic Stability Control (ESC) system, a Smart Cruise Control (SCC) system, an Advanced Driver Assistance System (ADAS), and a Traction Control System (TCS) have been provided in vehicles for the safety of a driver.

The TCS is an active safety device that improves acceleration performance and steering stability by preventing excessive slip of driving wheels when starting or accelerating on a low friction road surface or an asymmetric road surface.

The TCS controls a driving of the vehicle in consideration of a road surface state to exhibit optimum performance. Here, the road surface state may refer to a high friction road surface such as a dry asphalt road surface and a dry cement road surface, and the low friction road surface such as rain, snow, and dirt roads.

Previously, it determines whether it is the high friction road surface or the low friction road surface based on dynamic data such as a wheel speed, an engine torque and a vehicle speed, and it has been recognized whether it is the high friction road surface or the low friction road surface based on various sensors such as road directional ultrasonic sensors or microphones.

When the road surface is recognized based on the dynamic data, it is determined whether it is the high friction road surface or the low friction road surface based on a slip phenomenon occurring in the vehicle. Therefore, in the case of driving on a road with a specific pattern without rapid acceleration or rapid deceleration, there is a problem in that it is impossible to recognize whether the road surface being driven is the high friction road surface or the low friction road surface.

In the case of recognizing the road surface based on the road directional ultrasonic sensors, there is a problem of increasing a production cost of the vehicle because it is required to install an additional sensor on the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a road surface recognition apparatus that recognizes a road surface based on sound information and driving data, a vehicle having the same, and a method of controlling the vehicle.

Another aspect of the present invention is directed to providing a road surface recognition apparatus of obtaining sound data for a sound generated on a road surface using a sound detector provided on a rear right side of a vehicle body, a vehicle having the same, and a method of controlling the vehicle.

Additional aspects of the present invention will be set forth in part in the description which follows, and in part, will be obvious from the description, or may be learned by practice of the present invention.

According to various aspects of the present invention, there is provided a road surface recognition apparatus including: a sound data obtainer configured to obtain sound data for a sound detected by a sound detector; a driving data obtainer configured to obtain driving data of a vehicle for driving information detected by a driving information detector; and a road surface recognizer configured to recognize a type of road surface based on the sound data and the driving data.

The road surface recognition apparatus may further include a frequency transform device configured to transform the obtained sound data into sound data in a frequency domain; a first feature vector device configured to obtain a first feature vector using longitudinal acceleration data and driving speed data among the driving data, and the sound data in the frequency domain; and a first classifier configured to classify the type of road surface using the first feature vector and a first classifier model.

The road surface recognition apparatus may further include a second feature vector device configured to obtain a second feature vector based on a plurality of wheel speed data, longitudinal acceleration data, steering angle data, lateral acceleration data, and yaw rate data among the driving data; and a second classifier configured to classify the type of road surface using the second feature vector and a second classifier model.

The road surface recognition apparatus may further include a frequency transform device configured to transform the obtained sound data into sound data in a frequency domain; a first feature vector device configured to obtain a first feature vector using longitudinal acceleration data and driving speed data among the driving data, and the sound data in the frequency domain; a first classifier configured to classify the type of road surface in a first order using the first feature vector and a first classifier model; a second feature vector device configured to obtain a second feature vector based on a plurality of wheel speed data, longitudinal acceleration data, steering angle data, lateral acceleration data, and yaw rate data among the driving data; a second classifier configured to classify the type of road surface in a second order using the second feature vector and a second classifier model; and a third classifier configured to select the type of road surface classified by any one of the first and second classifiers based on the longitudinal acceleration data and reference longitudinal acceleration data.

The third classifier may be configured to: based on the longitudinal acceleration data and the reference longitudinal acceleration data, in a response to the longitudinal acceleration being less than the reference longitudinal acceleration, select the type of road surface classified primarily by the first classifier, and in a response to the longitudinal acceleration being greater than or equal to the reference longitudinal acceleration, select the type of road surface classified secondary by the second classifier.

The road surface recognition apparatus may further include the road surface recognizer configured to recognize the type of road surface based on the selected type of road surface and state transition information for a remaining type of road surface.

The first classifier may include a support vector machine. The second classifier may include a deep neural network.

The sound data obtainer may be configured to receive sound data from an Electronic Stability Control (ESC) system.

According to various aspects of the present invention, there is provided a vehicle including: a sound detector; a driving information detector; and a controller configured to obtain sound data for a sound detected by the sound detector, to obtain driving data for driving information detected by the driving information detector, to recognize a type of road surface based on the obtained sound data and the obtained driving data, and to control a driving force based on information related to the recognized type of the road surface.

The vehicle may further include a frequency transform device configured to transform the obtained sound data into sound data in a frequency domain; a first feature vector device configured to obtain a first feature vector using longitudinal acceleration data and driving speed data among the driving data, and the sound data in the frequency domain; a first classifier configured to classify the type of road surface in a first order using the first feature vector and a first classifier model; a second feature vector device configured to obtain a second feature vector based on a plurality of wheel speed data, longitudinal acceleration data, steering angle data, lateral acceleration data, and yaw rate data among the driving data; a second classifier configured to classify the type of road surface in a second order using the second feature vector and a second classifier model; and a third classifier configured to select the type of road surface classified by any one of the first and second classifiers based on the longitudinal acceleration data and reference longitudinal acceleration data.

The third classifier may be configured to: based on the longitudinal acceleration data and the reference longitudinal acceleration data, in a response to the longitudinal acceleration being less than the reference longitudinal acceleration, select the type of road surface classified primarily by the first classifier, and in a response to the longitudinal acceleration being greater than or equal to the reference longitudinal acceleration, select the type of road surface classified secondary by the second classifier.

The controller may further include a road surface recognizer configured to recognize the type of road surface based on the selected type of road surface and state transition information for a remaining type of road surface.

The first classifier may include a support vector machine. The second classifier may include a deep neural network.

The sound detector may be provided on a right rear side of a vehicle body.

The vehicle may further include a traction control system configured to control the driving force in a response to a control command of the controller.

The controller may be configured to obtain a friction coefficient corresponding to the information related to the recognized type of road surface, and to control an operation of at least one of a brake and an engine based on the obtained friction coefficient.

According to various aspects of the present invention, there is provided a method of controlling a vehicle including: obtaining, by a controller, sound data for a sound detected by a sound detector while driving; obtaining, by the controller, driving data for driving information detected by a driving information detector; recognizing, by the controller, a type of road surface based on the obtained sound data and the obtained driving data; and controlling, by the controller, a traction control system based on information related to the recognized type of the road surface.

The recognizing of the type of road surface may include transforming the obtained sound data into sound data in a frequency domain; obtaining a first feature vector using longitudinal acceleration data and driving speed data among the driving data, and the sound data in the frequency domain; and classifying the type of road surface in a first order using the first feature vector and a first classifier model.

The recognizing of the type of road surface may include obtaining a second feature vector based on a plurality of wheel speed data, longitudinal acceleration data, steering angle data, lateral acceleration data, and yaw rate data among the driving data; and classifying the type of road surface in a second order using the second feature vector and a second classifier model.

The recognizing of the type of road surface may include transforming the obtained sound data into sound data in a frequency domain; obtaining a first feature vector using longitudinal acceleration data and driving speed data among the driving data, and the sound data in the frequency domain; classifying the type of road surface in a first order using the first feature vector and a first classifier model; obtaining a second feature vector based on a plurality of wheel speed data, longitudinal acceleration data, steering angle data, lateral acceleration data, and yaw rate data among the driving data; classifying the type of road surface in a second order using the second feature vector and a second classifier model; selecting the type of road surface classified by any one of the first and second classifiers based on the longitudinal acceleration data and reference longitudinal acceleration data; and based on the selected type of road surface and state transition information for the remaining type of road surface, finally recognizing the type of road surface.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10 is a view exemplarily illustrating samples of each data obtained by a second feature obtainer of a road surface recognition apparatus of a vehicle according to an exemplary embodiment of the present invention.

Figure 1:
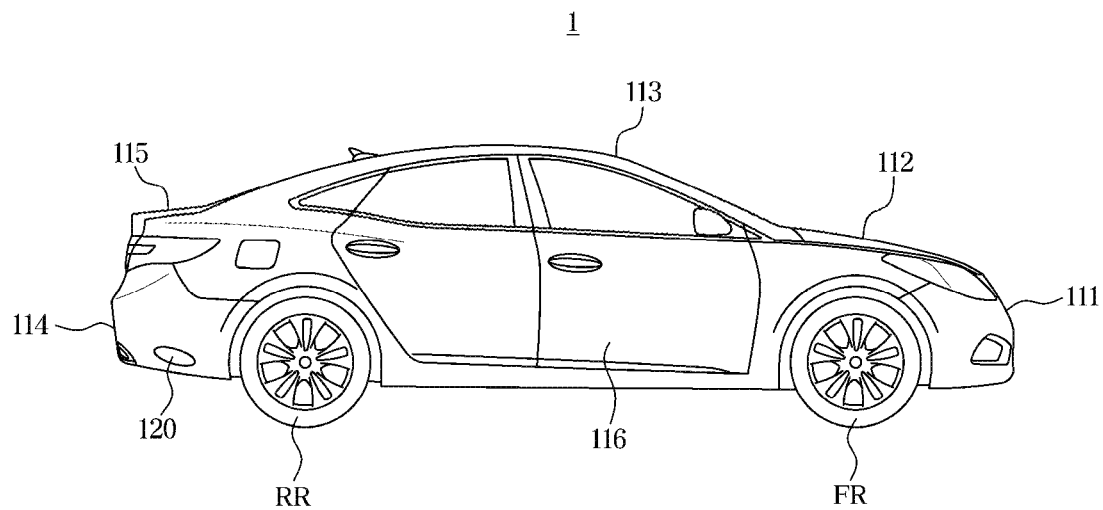
FIG. 1 is an external view exemplarily illustrating a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Like reference numerals refer to like elements throughout the specification. Not all elements of the embodiments of the present invention will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present invention will be described with reference to accompanying drawings.

FIG. 1 is an external view exemplarily illustrating a vehicle according to an exemplary embodiment of the present invention.

As illustrated in FIG. 1, an exterior of a vehicle body may include a front panel 111, a bonnet 112, a roof panel 113, a rear panel 114, a trunk 115, front, rear, left, and right doors 116, a window glass provided to be opened or closed on front, rear, left, and right doors 116.

Here, the window glass includes a quarter window glass provided between pillars but not to be opened and closed, a rear window glass provided on a rear side, and a front window glass provided on a front side thereof.

The exterior of the vehicle body may further include a side mirror or the like that provides a driver with a view of the rear of the vehicle 1.

The vehicle 1 may include a plurality of lamps that allow easy viewing of all information related to the vehicle 1 while keeping an eye on a front field of view.

The vehicle 1 may further include a sound detector 120 provided on a rear right side of the vehicle body and detecting a sound generated from a road surface.

The sound detector 120 may be provided on the right side of the rear panel 114, and may be provided at a position adjacent to a rear right wheel RR.

The position of the sound detector 120 may be a position configured for blocking sounds such as a wind noise and a noise from an engine.

A chassis of the vehicle 1 may include a driving device such as a power generating device, a power transmission device, a steering device, a braking device, a suspension device, and a transmission device configured for applying a driving force and a braking force to the front, rear, left and right wheels.

In a case of an internal combustion engine vehicle, the power generating device may include the engine, a fuel device, a cooling and refueling device, and an electric device.

Furthermore, various safety devices may be provided in the vehicle 1 for the safety of the driver and occupant.

The safety devices of the vehicle 1 may include various types of safety devices such as a warning system that outputs warning information in a dangerous situation so that the driver recognizes a danger of an accident, an automatic emergency braking system (AEBS) that operates the braking device and performs emergency braking by lowering an engine output when another vehicle within a certain distance is located in front of a subject vehicle, an airbag control device, an electronic stability control (ESC) that controls the vehicle's posture during acceleration or cornering of the vehicle 1, a tire pressure monitoring system (TPMS), an anti-lock brake system (ABS) to prevent the wheel from being locked during sudden braking, and a traction control system (TCS) that improves acceleration performance and steering stability by preventing excessive slip of the driving wheel during start-up or acceleration.

The wheels of the vehicle 1 rotate to allow the vehicle 1 to move, and include the wheel and a tire, respectively.

The wheel supports the vehicle 1 by sharing a total weight of the vehicle 1 together with the tire, and performs withstanding a torque while driving and braking, an impact from the road surface, a centrifugal force when turning, and a lateral force generated when the vehicle 1 is tilted.

Such the wheel may be provided with a wheel speed detection unit of detecting the rotation speed of the wheel.

The tire is inserted into the wheel and rotates integrally, absorbs the impact of the road surface while driving, and minimizes slip with the road surface when braking, driving, and turning.

Figure 2:
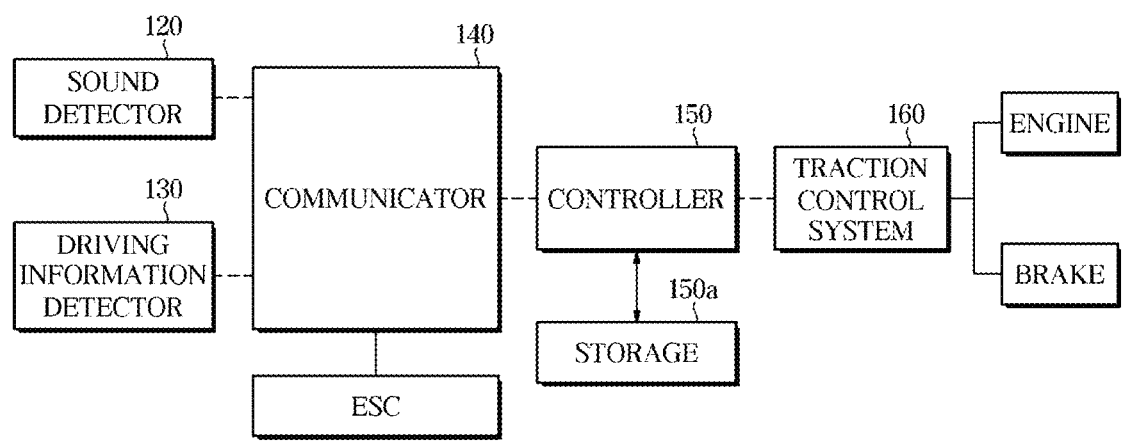
FIG. 2 is a block diagram of a vehicle control according to an exemplary embodiment of the present invention.

FIG. 2 is a block diagram of a vehicle control according to an exemplary embodiment of the present invention.

The vehicle 1 may include a sound detector 120, a driving information detector 130, a communicator 140, a controller 150, a storage 150a, and a traction control system 160.

The sound detector 120 may detect sound generated from the vehicle 1, the tires, or the road surface, and output a signal for the detected sound to the controller 160.

The driving information detector 130 may detect driving information while the vehicle 1 is driving and output a signal for the detected driving information to the controller 160.

A driving signal may vary according to the driving information. For example, when the driving information is longitudinal acceleration information, the driving information detector 130 may output a signal for the longitudinal acceleration.

When the driving information is wheel speed information, the driving information detector 130 may output a signal for the wheel speed.

The driving information detector 130 may include a longitudinal acceleration detector for detecting acceleration in a longitudinal direction of the vehicle 1 while the vehicle 1 is driving.

The driving information detector 130 may include a speed detector for detecting a driving speed of the vehicle 1.

The speed detector may include a plurality of wheel speed sensors each provided on a plurality of wheels, detecting a rotation speed of each wheel, and outputting speed information on the detected rotation speed of each wheel.

The speed detector may include an acceleration sensor that detects acceleration of the vehicle 1, and may include all of the plurality of wheel speed sensors and the acceleration sensor.

The driving information detector 130 may further include a steering angle detector that detects a steering angular velocity of a steering wheel while the vehicle 1 is driving, a yaw rate detector that detects a yaw moment of the vehicle 1, and a lateral acceleration detector that detects an acceleration in a lateral direction of the vehicle 1.

The driving information detector 130 may include an inertia measurement unit (IMU) inside the vehicle 1.

The communicator 140 may transmit the signal corresponding to the sound detected by the sound detector 120 to the controller 150, and transmit the signal corresponding to the driving information detected by the driving information detector 130 to the controller 150.

The communicator 140 may communicate with an external device. Here, the external device may include at least one of a server, an infrastructure, a user terminal, and another vehicle.

The communicator 140 may communicate between various devices provided inside the vehicle 1.

The communicator 140 may include one or more components that enable communication between components inside the vehicle 1, and for example, may include at least one of a short-range communication module, a wired communication module, or a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wired communication module may further include a Local Interconnect Network (LIN).

The wireless communication module may include a wireless communication module supporting a variety of wireless communication methods, e.g., Wi-Fi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The communicator 140 may include a position receiver that receives the position information related to the vehicle 1 and transmits the received position information to the controller 150.

The position receiver may include a Global Positioning System (GPS) receiver that determines the position of the vehicle 1 by performing communication with a plurality of satellites.

The position receiver may include a GPS signal receiver and a signal processor for processing GPS signals obtained by the GPS signal receiver. The GPS signal receiver may include an antenna for receiving signals of a plurality of GPS satellites. The antenna may be provided the exterior of the vehicle 1.

The signal processor of the position receiver may include software for obtaining the current position using distance and time information corresponding to the position signals of the plurality of GPS satellites and an output configured to output the obtained position information related to the vehicle 1.

The controller 150 may obtain sound data based on a sound signal received from the sound detector 130, convert the obtained sound data to a frequency, and obtain the data as frequency data.

Here, the sound data for the received signal may be data in a time domain.

The controller 150 may obtain a first feature vector for sound data, longitudinal acceleration data, and driving speed data for the frequency domain, and firstly recognize the road surface based on the obtained first feature vector. The controller 150 may perform road surface recognition in the first order by use of the obtained first feature vector and a first classifier model.

The controller 150 may obtain driving data corresponding to the driving information, obtain a second feature vector for the obtained driving data, and secondly recognize the road surface based on the obtained second feature vector. That is, the controller 150 may perform road surface recognition in a second order by use of the obtained second feature vector and the second classifier model.

Here, the driving data may include at least one of lateral acceleration data, wheel speed data, longitudinal acceleration data, yaw rate, and steering angle data.

The controller 150 may select one of road surface information related to the road surface recognized as a primary and road surface information related to the road surface recognized as a secondary based on the longitudinal acceleration information.

The controller 150 may receive signals from the sound detector 120 and the driving information detector 130 through CAN communication.

The controller 150 may perform CAN communication with an Electronic Stability Control (ESC) system, and obtain the sound signal and the driving signal from the ESC.

The controller 150 may obtain a longitudinal slip ratio and a longitudinal traction force based on the wheel speed data and the longitudinal acceleration data.

$$\text{Slip ratio} = \begin{cases} \dfrac{\omega r - V_x}{\omega r}, & \text{for driving} \\ \dfrac{V_x - \omega r}{V_x}, & \text{for braking} \end{cases}$$

w is the wheel speed, r is a tire radius, and Vx is the vehicle's longitudinal speed The controller 150 may control the brake and engine torque of each wheel based on the wheel slip.

When the type of road surface is recognized, the controller 150 may obtain a friction coefficient corresponding to the recognized type of road surface, obtain an optimum wheel slip based on the obtained friction coefficient, and may control the traction control system based on the obtained wheel slip.

The friction coefficient corresponding to the type of road surface may be an experimentally obtained and stored value.

The controller 150 may be a controller that performs overall control of vehicle driving.

The controller 150 is a road surface recognition apparatus, and may be a microprocessor, a CPU, or a processor.

The controller 150 may be implemented with one processor.

The controller 150 may include a non-transitory memory storing an algorithm to control operation of the components in the vehicle 1 or data about a program that implements the algorithm, and a processor carrying out the aforementioned operation using the data stored in the memory. The memory and the processor may be implemented in separate chips. Alternatively, the memory and the processor may be implemented in a single chip.

A configuration of the controller 150 will be described in detail later.

The storage 150a may store information corresponding to the type of road surface.

The storage 150a may store information related to a plurality of state transition information and hysteresis time. Here, the hysteresis time may be a predetermined time period.

For example, the storage may store state change information for dry asphalt road and ice road, a first predetermined time period for determining the dry asphalt road, and a second predetermined time period for determining the ice road.

The storage 150a may store state transition information for dry asphalt road and mud road, state transition information for dry asphalt road and sand road, state transition information for ice road and mud road, state transition information for ice and sand road, and state transition information for mud road and sand road.

The storage 150a may further store a predetermined time period for each load determination in each state transition information.

The storage 150a may be implemented with at least one of the non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The storage 150a may be a memory implemented with a chip separate from the aforementioned processor in relation to the controller 150, or may be implemented integrally with the processor in the single chip.

The traction control system 160 may improve acceleration performance and steering stability by preventing excessive slip of driving wheels among wheels during start-up or acceleration. The traction control system 160 may control at least one of a brake and the engine in conjunction with other devices.

The vehicle 1 may include a power device, the braking device that generates braking force of the vehicle 1, the suspension device that adjusts damping of the vehicle 1, an engine control device that automatically turns on or off the engine, and the steering device that changes a driving direction of the vehicle 1.

The power device may include the power generating device that generates power, and the power transmission device that transmits the generated power to a wheel.

The braking device may perform an auto hold function.

Here, the auto hold function is a function that holds the wheel so that the vehicle 1 does not abruptly drive because the braking force is maintained even when a pressure applied to a brake pedal is released during a temporary stop (e.g., waiting for a traffic light) while a shift lever is in a drive stage (D stage). When an accelerator pedal is pressed, the auto hold function is released, and the braking force is applied to the wheel so that the vehicle 1 does not push on a road with a certain inclination or higher.

The engine control device may turn the engine on or off.

This engine control device may perform an Idle Stop and Go (ISG) function.

The ISG function is to automatically turn off the engine when it stops for waiting for the traffic light, etc., releases the pressure applied to the brake pedal when starting, and is to automatically turn on the engine (that is, start on) when the pressure applied to the brake pedal is released at the start, the pressure is applied to the accelerator pedal, or a position of the shift lever is moved to the drive stage (D stage).

At least one component may be added or deleted according to the performance of the components of the vehicle 1 illustrated in FIG. 2. Furthermore, it will be readily understood by those of ordinary skill in the art that the mutual positions of the components may be changed corresponding to the performance or structure of the system.

Figure 3:
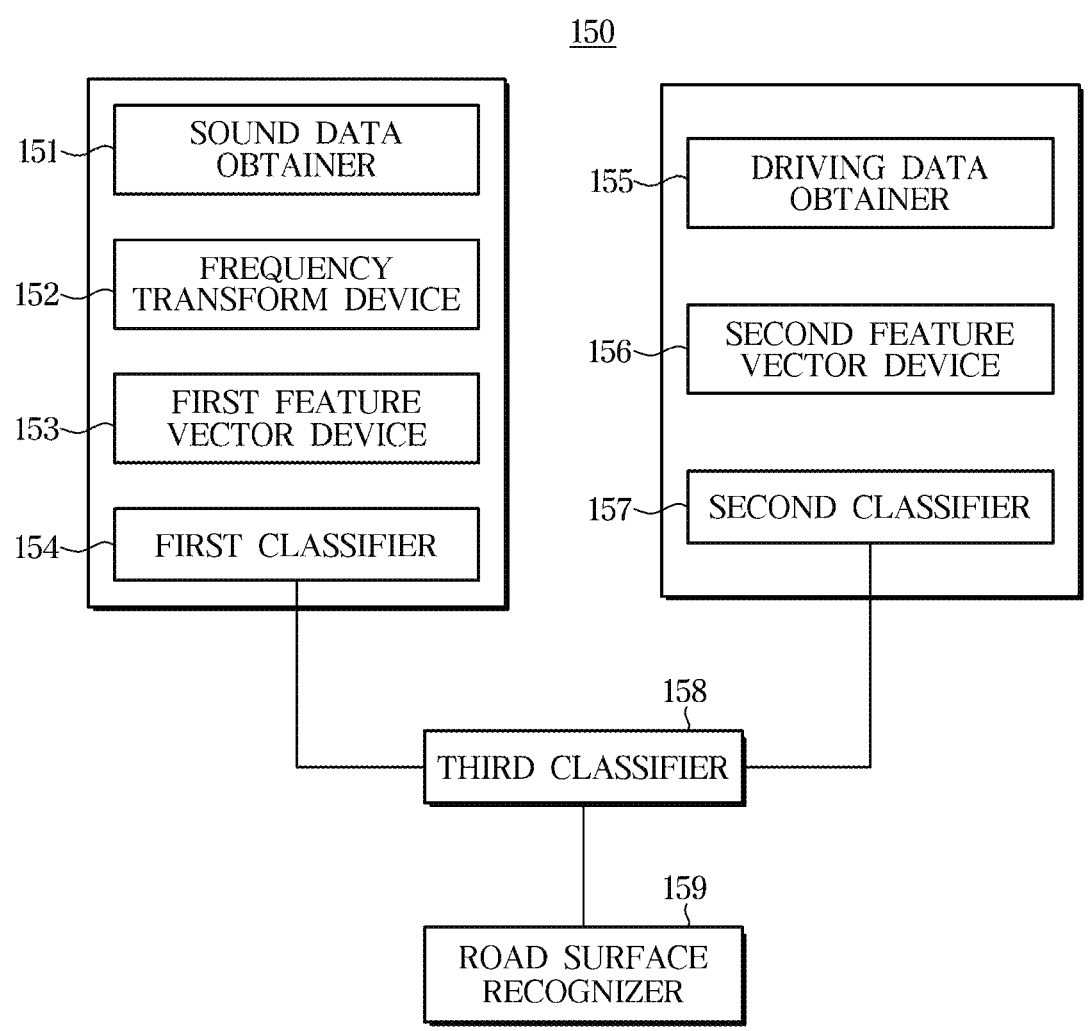
FIG. 3 is a block diagram of a road surface recognition apparatus of a vehicle according to an exemplary embodiment of the present invention.

FIG. 3 is a block diagram of a road surface recognition apparatus of a vehicle according to an exemplary embodiment of the present invention.

Furthermore, the road surface recognition apparatus illustrated in FIG. 3 may be the controller 150 provided in the vehicle 1.

The road surface recognition apparatus may include a sound data obtainer 151, a frequency transform device 152, a first feature vector device 153, a first classifier 154, a driving data obtainer 155, a second feature vector device 156, a second classifier 157, a third classifier 158, and a road surface recognizer 159.

The sound data obtainer 151 may perform CAN communication with the ESC, receive the sound signal from the ESC, and obtain the sound data for the received sound signal.

The sound data obtainer 151 may receive the sound signal from the sound detector 120 through CAN communication and obtain the sound data for the received sound signal.

The frequency transform device 152 may transform the sound data in the time domain into the sound data in the frequency domain and obtain a frequency component of the transformed sound data in the frequency domain.

The frequency transform device 152 may include at least one of a Discrete-time Fourier Transform (DTFT) and a Fast Fourier Transform (FFT), and may further include a signal processor.

The frequency transform device 152 may select a preset number of samples based on a reference sample rate from among the obtained sound data.

The reference sample rate may be a 10 kHz sample rate, and the preset number may be 128.

The signal processor may convert a digital signal for the obtained sound data into an analog signal.

The signal processor may obtain the sound signal up to the frequency domain up to a reference frequency based on the reference sample rate. The obtained sound signal may be the analog signal.

The signal processor may obtain the sound signal detected by the sound detector 120 by performing signal processing on sound data using the Nyquist sampling theorem.

That is, the signal processor may obtain the sound signal in the frequency domain up to the reference frequency by use of the Nyquist sampling theorem. Here, the reference frequency may be 5 kHz.

The frequency transform device 152 may transform the sound signal in the time domain into the sound signal in the frequency domain during a reference time and obtain the frequency component of the transformed sound signal in the frequency domain. Here, the reference time $\Delta T$ may be 12.8 ms.

The frequency transform device 152 may obtain the frequency component by performing the FFT on the obtained sound signal.

The FFT may be an algorithm that determines an approximate value of a function, and may be an algorithm that reduces the number of operations when determining the DTFT based on the Fourier transform.

Figure 4:
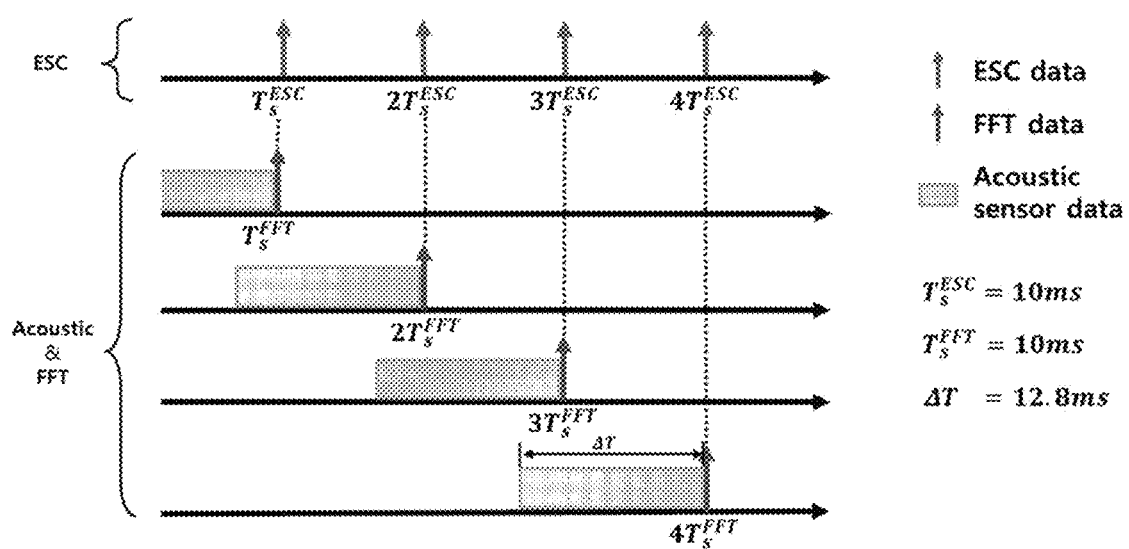
FIG. 4 is a view of obtaining a sound signal in a frequency domain through Fourier transform in a road surface recognition apparatus of a vehicle according to an exemplary embodiment of the present invention.
Figure 5A:
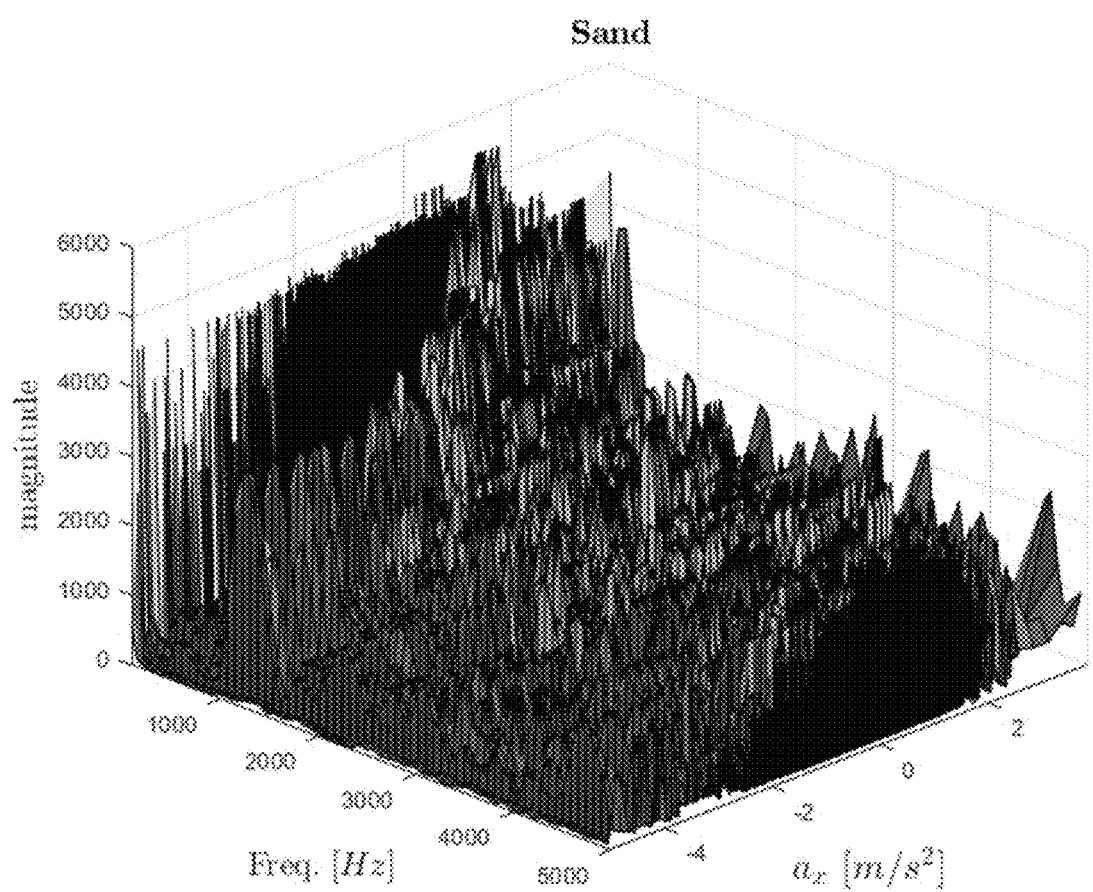
FIG. 5A, FIG. 5B, FIG. 5C, and FIG. 5D are views exemplarily illustrating frequency band acceleration information corresponding to a type of road surface obtained by a road surface recognition apparatus of a vehicle according to an exemplary embodiment of the present invention.
Figure 5B:
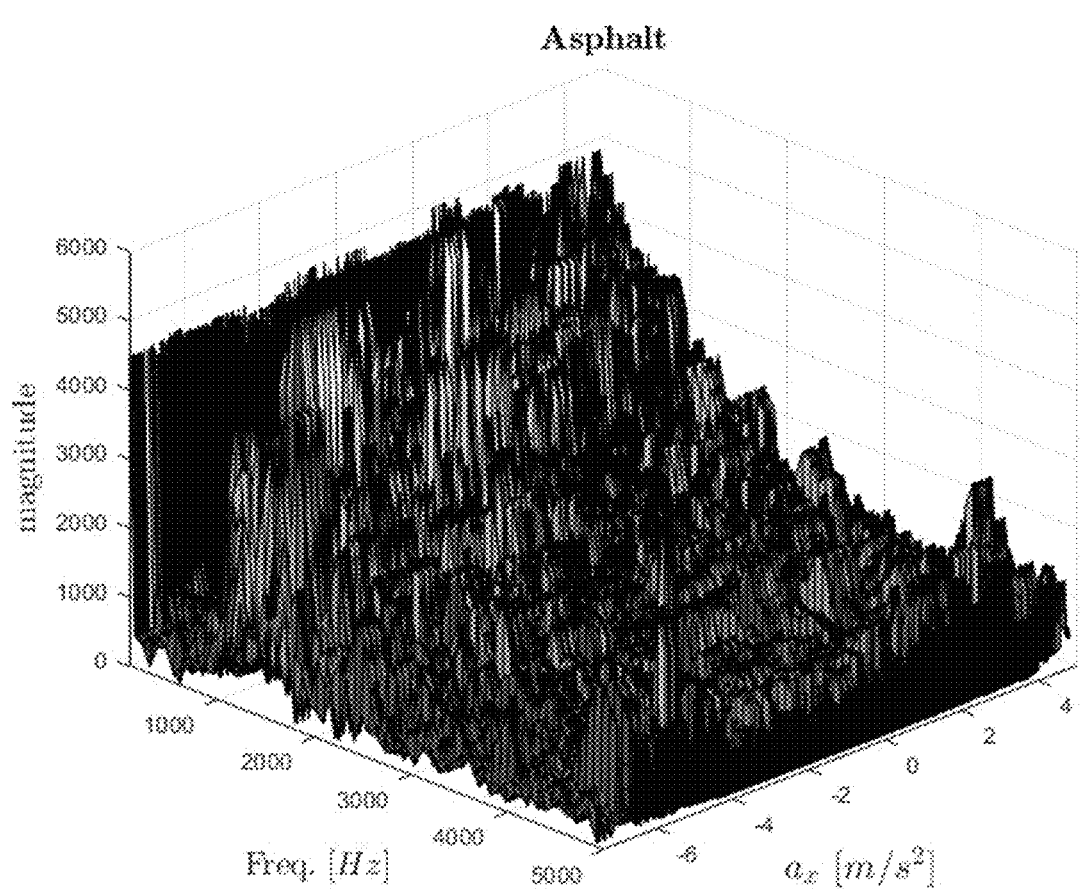
Figure 5C:
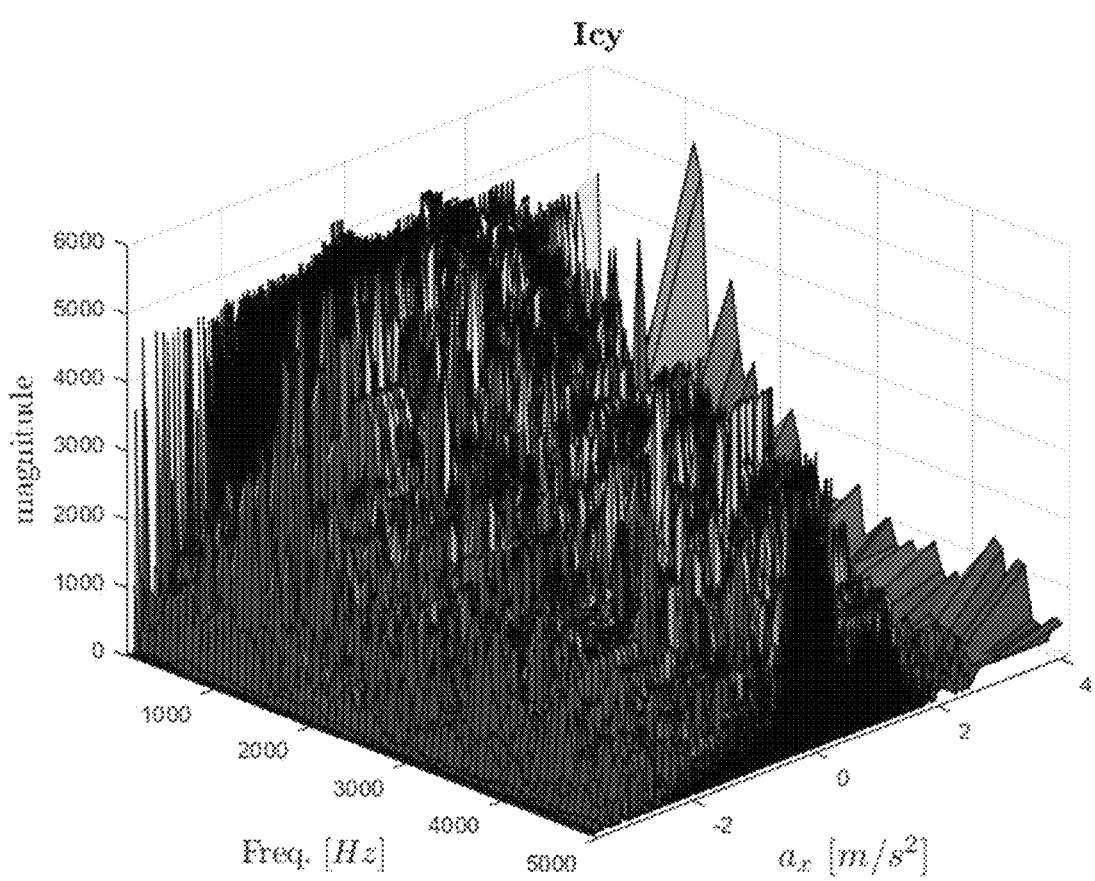
Figure 5D:
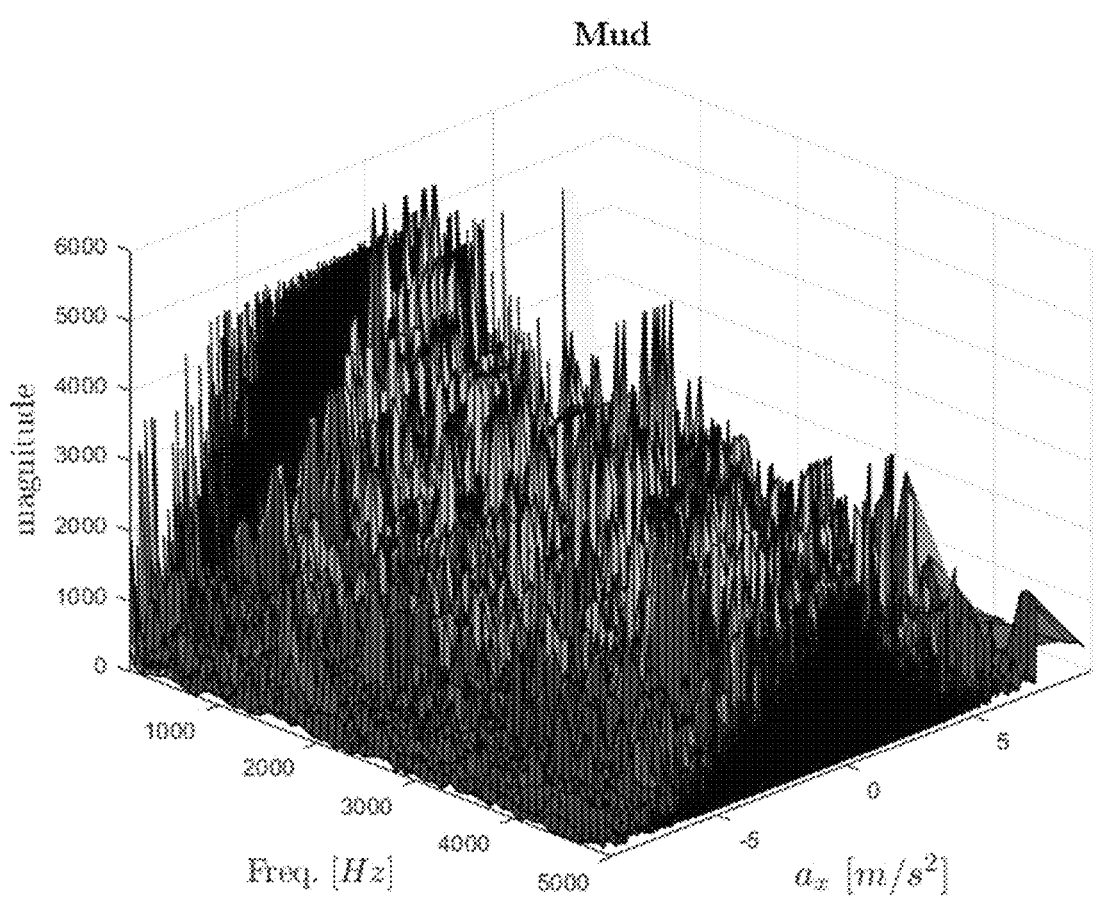

As illustrated in FIG. 4, the frequency transform device 152 may obtain the sound signal (acoustic sensor data) of the sound detector 120 based on signal processing for the sound data received from the ESC, but may obtain the sound signal (acoustic sensor data) of the sound detector 120 based on the received time of the sampled sound data (ESC data).

The frequency transform device 152 may obtain the sound signal (FFT data) in the frequency domain for the obtained sound signal (acoustic sensor data) of the sound detector 120.

The obtainment time (T: FFT) of the sound signal (FFT data) in the frequency domain may be the same as the reception time (T: ESC) of the sampled sound data (ESC data).

The first feature vector device 153 may obtain the first feature vector based on frequency band information for a preset type of road surface, the sound signal in the frequency domain, and the driving signal detected by the driving information detector 130.

Here, the driving signal detected by the driving information detector 130 may be a longitudinal acceleration signal for the longitudinal acceleration detected by the longitudinal acceleration detector.

The first feature vector device 153 may obtain the sound data for the sound signal in the frequency domain and obtain longitudinal acceleration data for the detected driving signal.

The first feature vector device 153 may obtain a sound value for the sound signal in the frequency domain and obtain a longitudinal acceleration value for the detected driving signal.

This is because the sound between the wheel and the road surface is affected by the slip of the tire generated by the acceleration in the longitudinal direction thereof. Also, the lower the longitudinal acceleration (i.e., the longitudinal acceleration), the more the frequency features appear.

That is, the first feature vector device 153 may obtain the first feature vector based on frequency band information, longitudinal acceleration data, and sound data for the preset type of road surface.

The driving signal detected by the driving information detector 130 may include the longitudinal acceleration signal for the longitudinal acceleration detected by the longitudinal acceleration detector and a driving speed signal for the driving speed detected by the speed detector.

This is because the longitudinal acceleration depends on the driving speed of the vehicle 1. In the instant case, the first feature vector device 153 may obtain the first feature vector based on the frequency band information, the longitudinal acceleration data, the driving speed data, and the sound data for the preset type of road surface.

$$\text{feature vector} = \begin{bmatrix} freq^1 \\ freq^2 \\ \vdots \\ freq^N \\ V_x \\ a_x \end{bmatrix} \in \mathbb{R}^{(N+2)\times 1}$$

Where N is the number of frequencies selected for the type of road surface.

The frequency band information corresponding to the type of road surface will be described with reference to FIGS. 5A, 5B, 5C, and 5D.

As illustrated in FIGS. 5A, 5B, 5C, and 5D, the frequency band corresponding to the sand road is 1,000 Hz or less, the frequency band corresponding to the dry road is 1,000 to 2,000 Hz, the frequency band corresponding to the ice road is 2,000 to 3,000 Hz, and the frequency band corresponding to the mud road may be 4,000 Hz or more.

The information corresponding to the frequency band corresponding to each type of road surface may be stored in storage 150a.

The first classifier 154 may first classify the road surface based on the obtained first feature vector.

Figure 6:
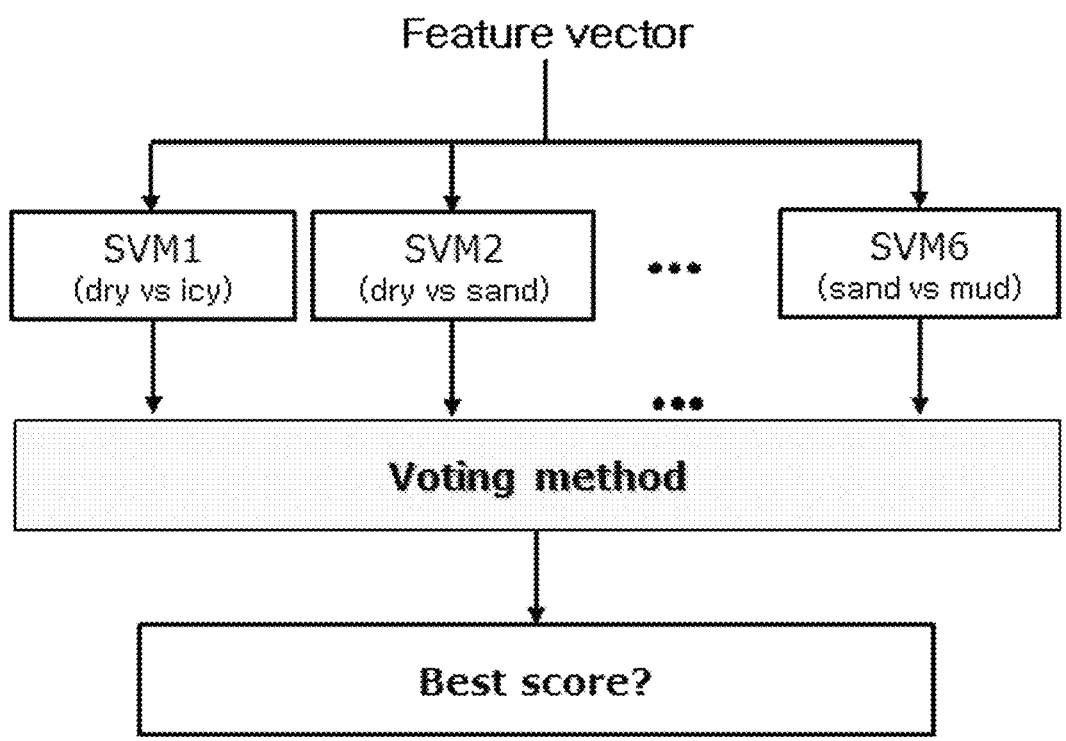
FIG. 6 is a view exemplarily illustrating a support vector machine for a road surface recognition apparatus of a vehicle according to an exemplary embodiment of the present invention.
Figure 7A:
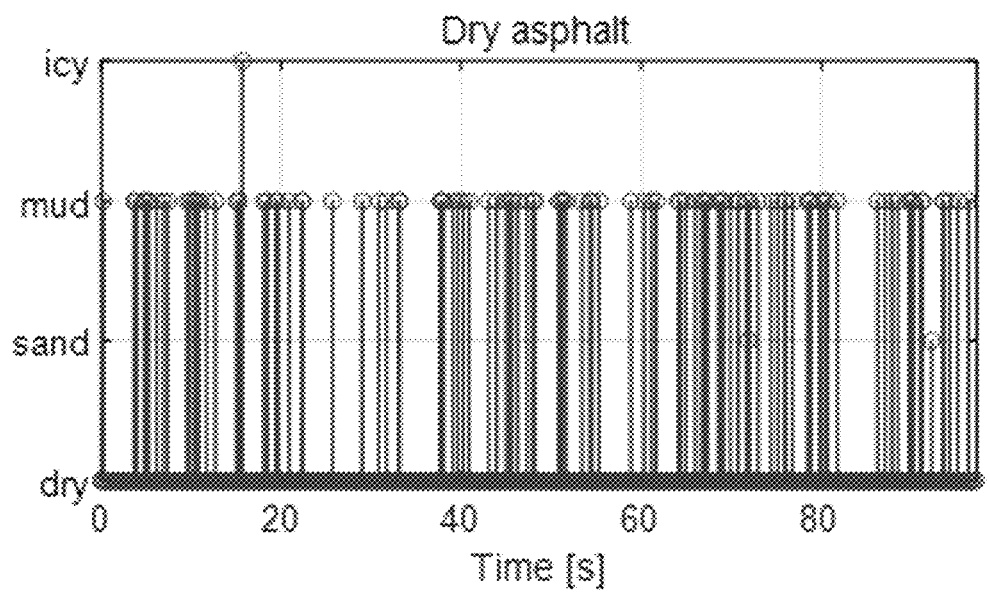
FIG. 7A, FIG. 7B, FIG. 7C, and FIG. 7D are views for classifying a road surface through a voting method in a road surface recognition apparatus of a vehicle according to an exemplary embodiment of the present invention.
Figure 7B:
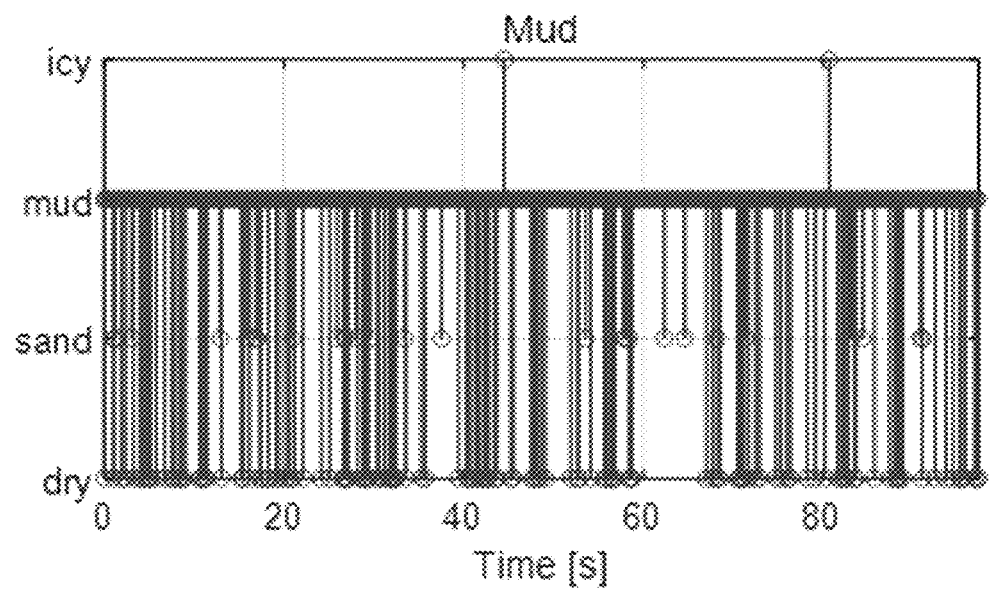
Figure 7C:
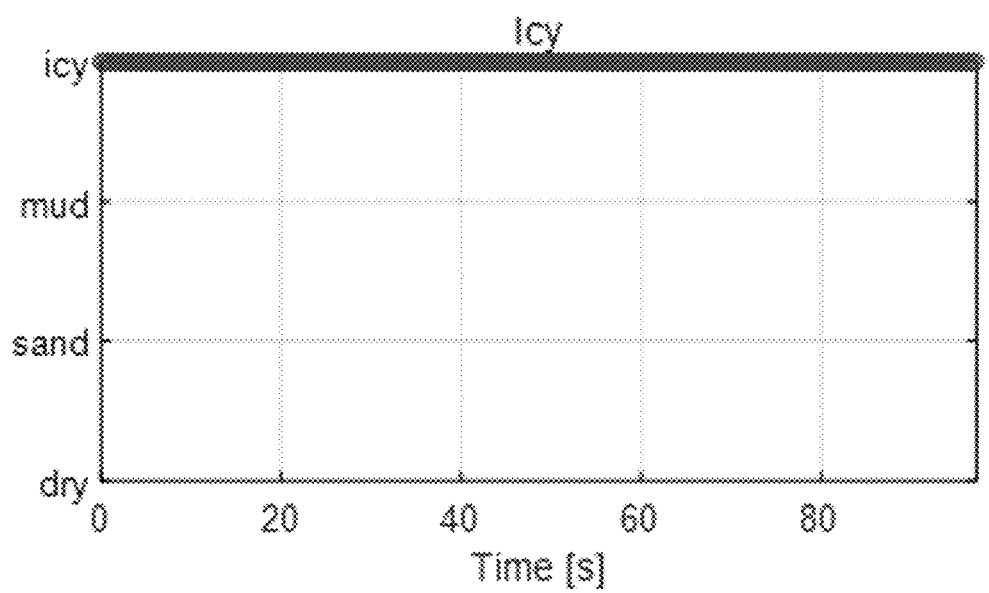
Figure 7D:
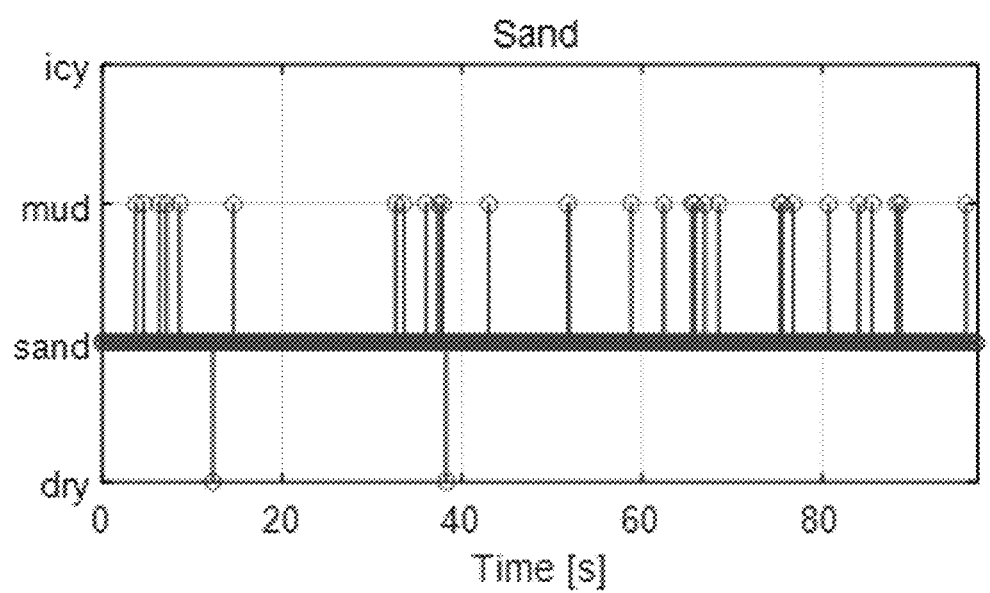
Figure 8A:
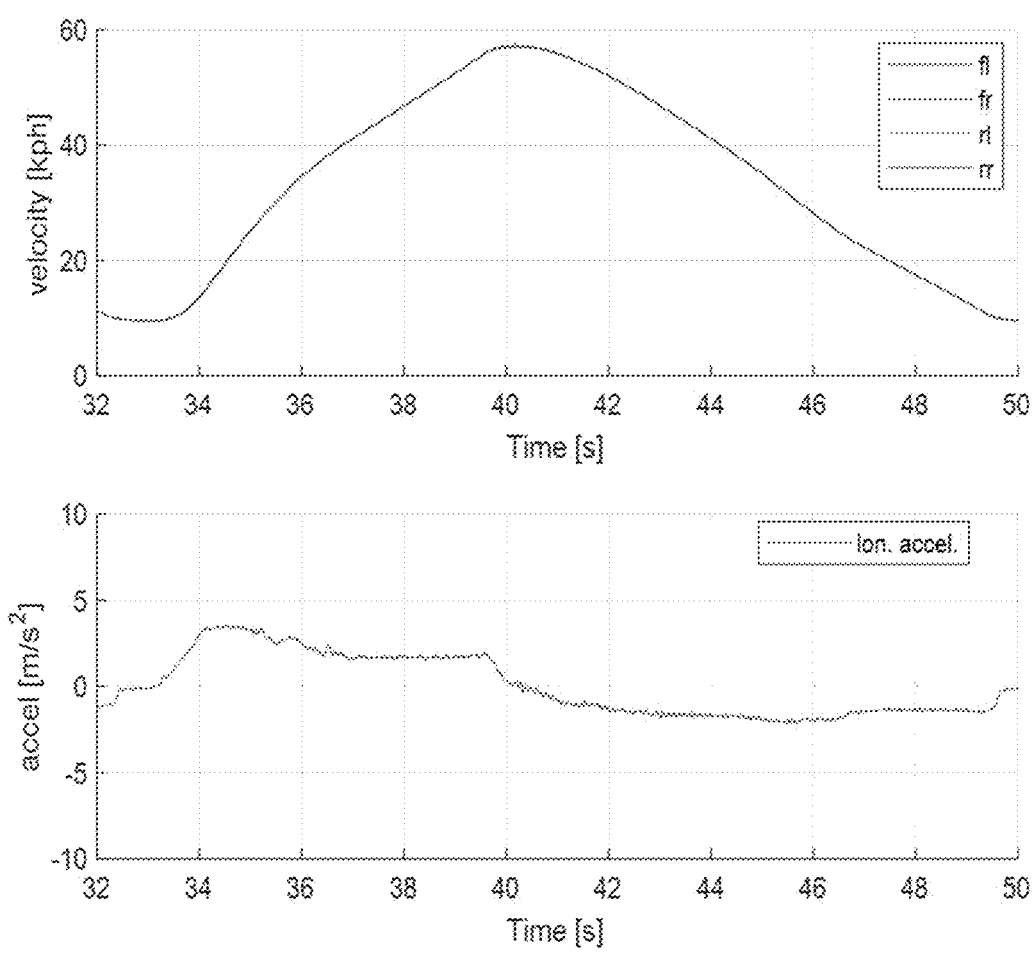
FIG. 8A, FIG. 8B, FIG. 8C, and FIG. 8D are graphs illustrating wheel speeds and longitudinal accelerations affecting a longitudinal motion in a road surface recognition apparatus of a vehicle according to an exemplary embodiment of the present invention.
Figure 8B:
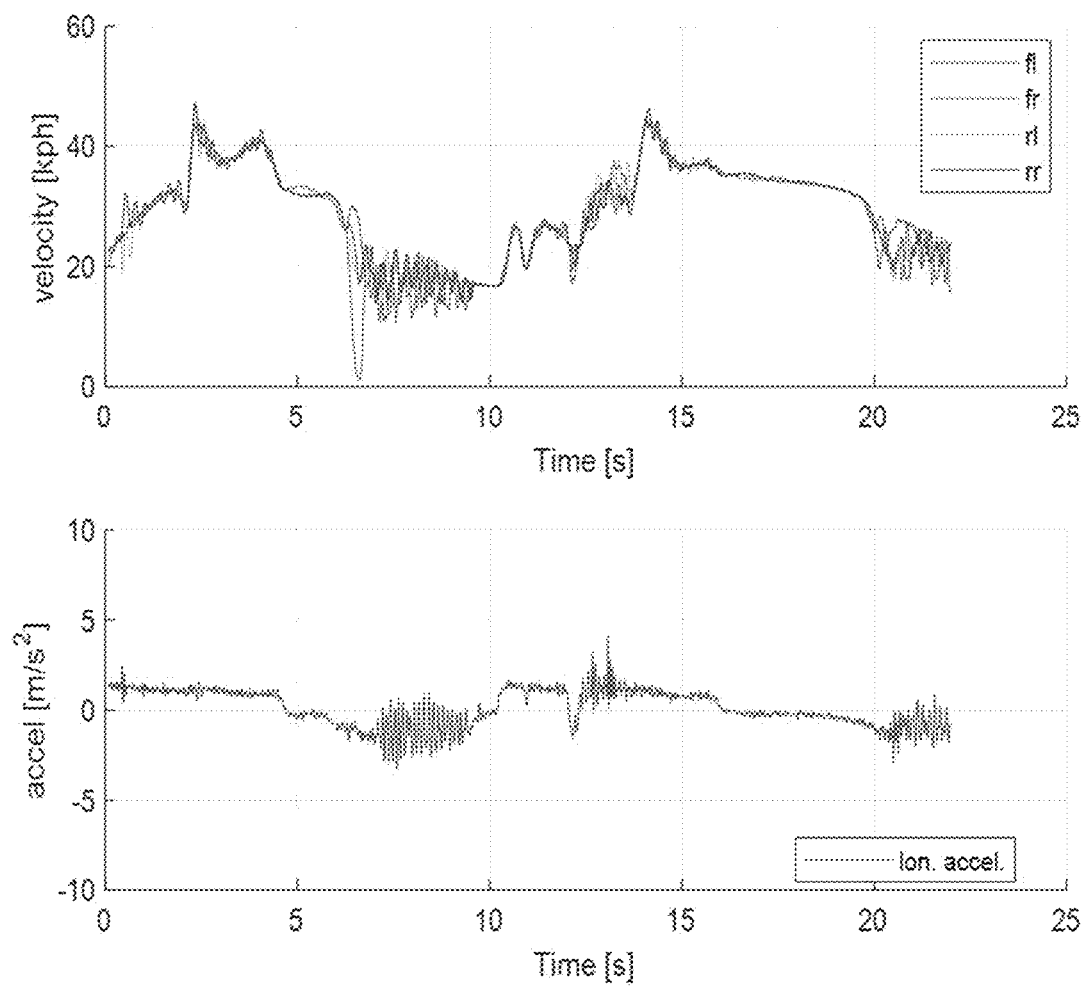
Figure 8C:
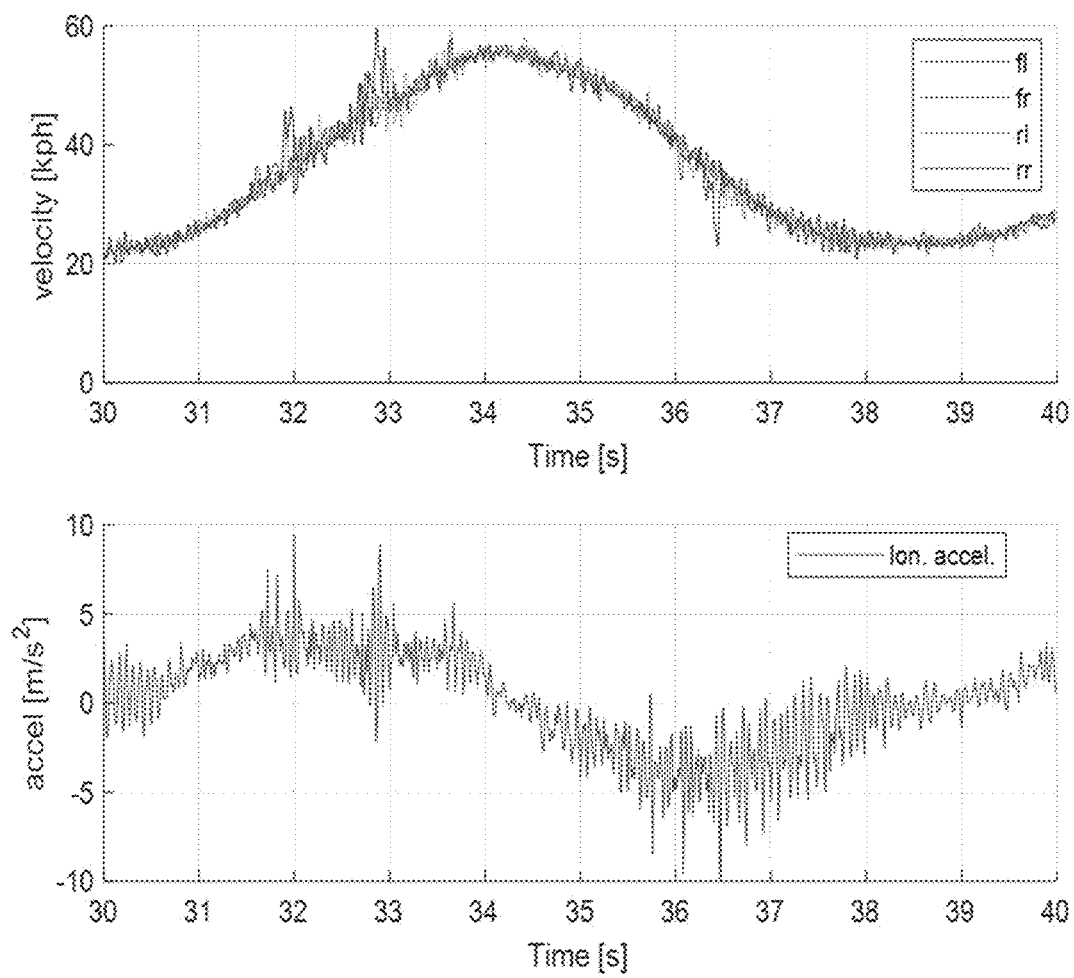
Figure 8D:
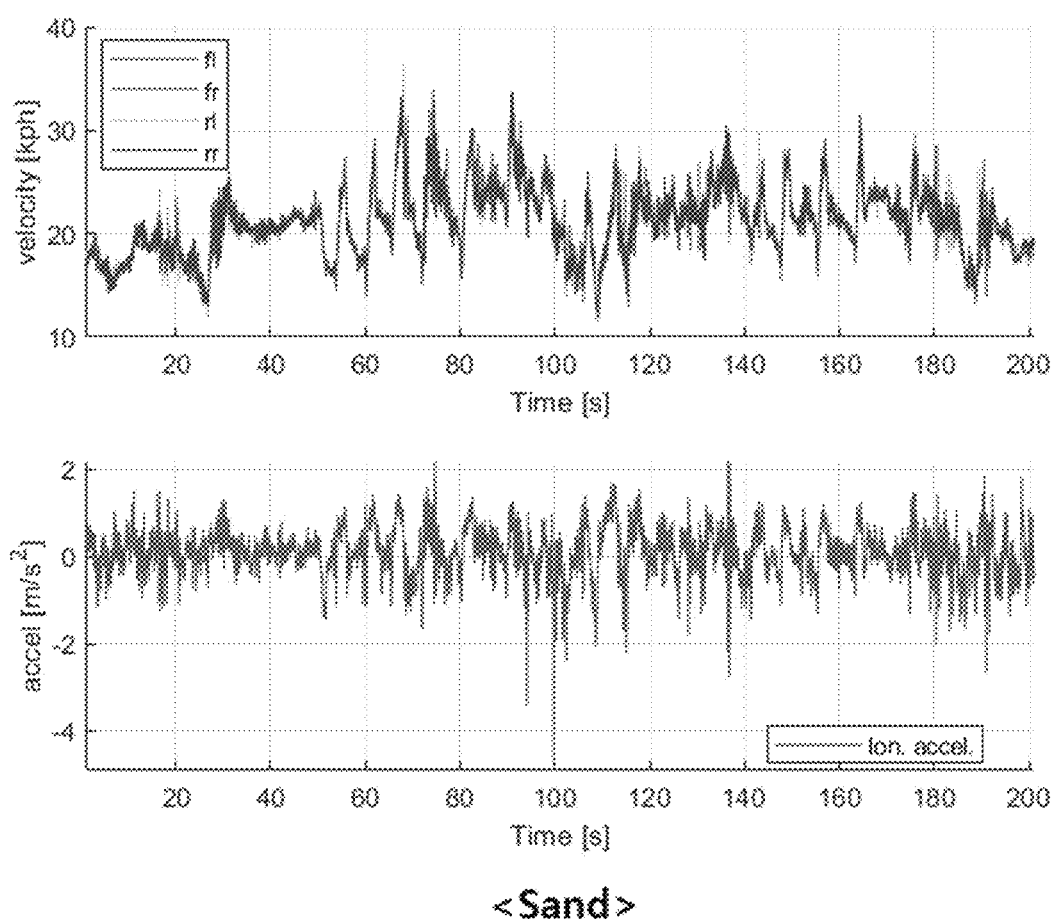
Figure 9A:
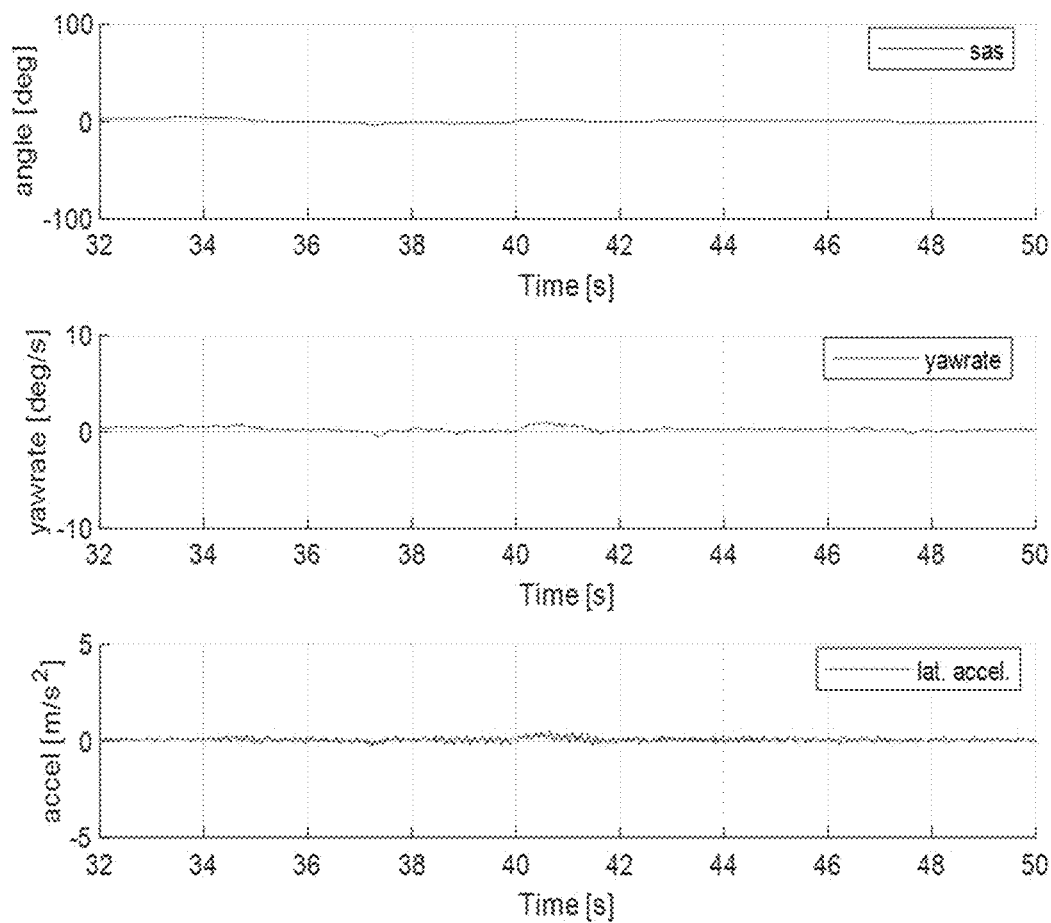
FIG. 9A, FIG. 9B, FIG. 9C, and FIG. 9D are graphs illustrating steering angle data, yaw rate data, and lateral acceleration data corresponding to a type of road surface in a road surface recognition apparatus of a vehicle according to an exemplary embodiment of the present invention.
Figure 9B:
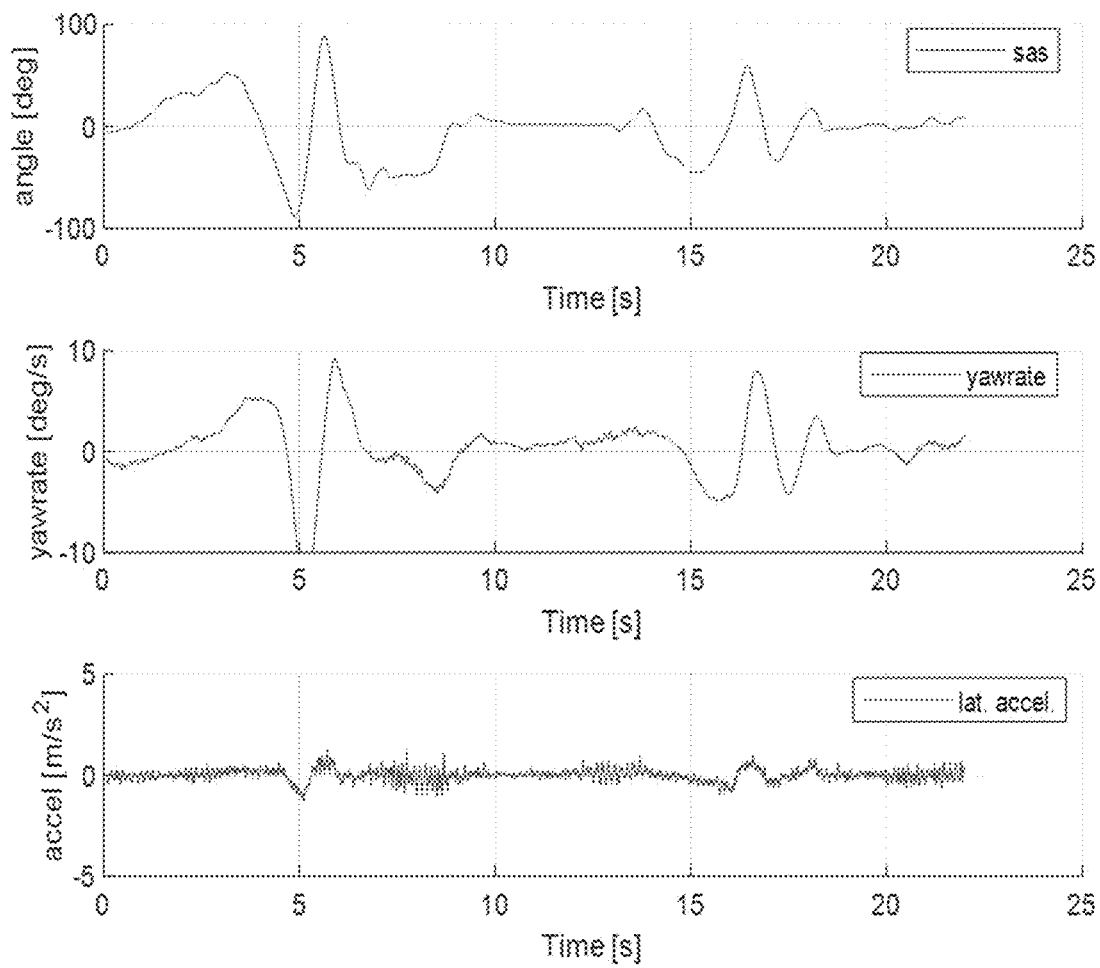
Figure 9C:
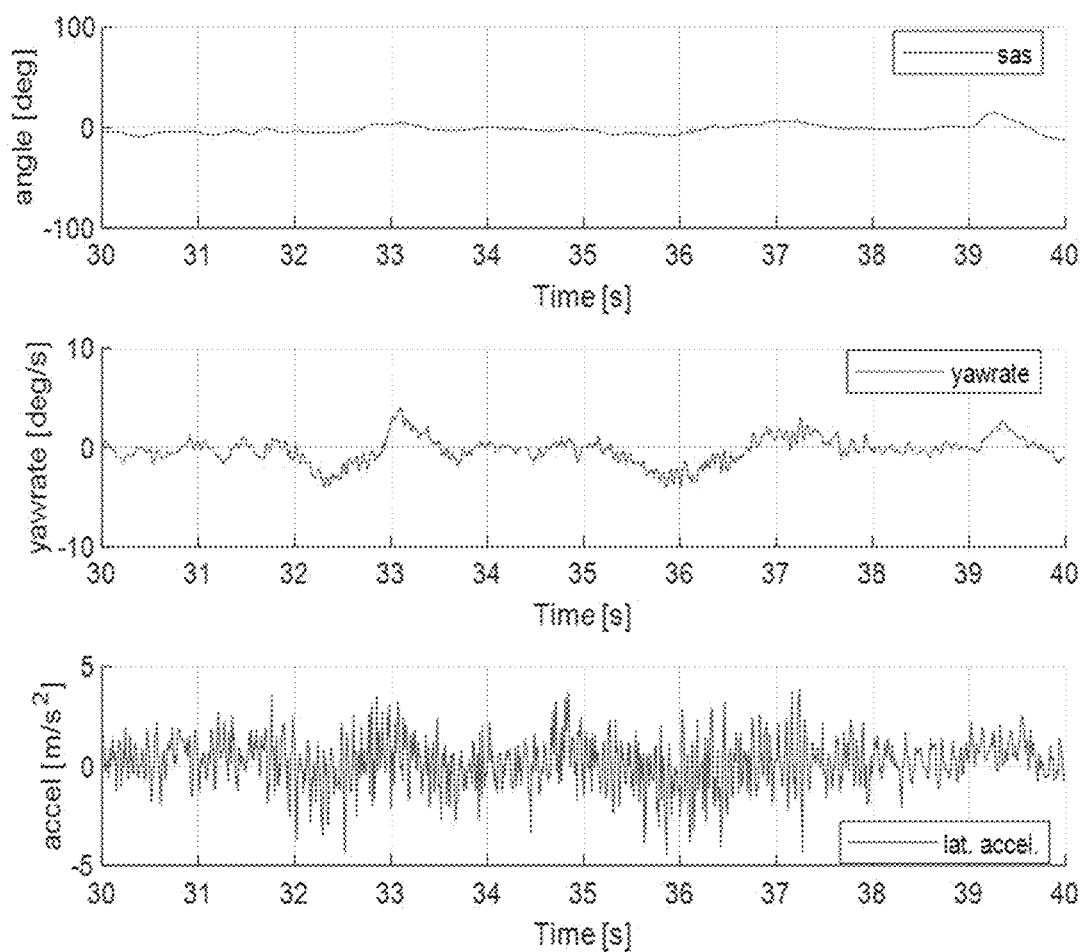
Figure 9D:
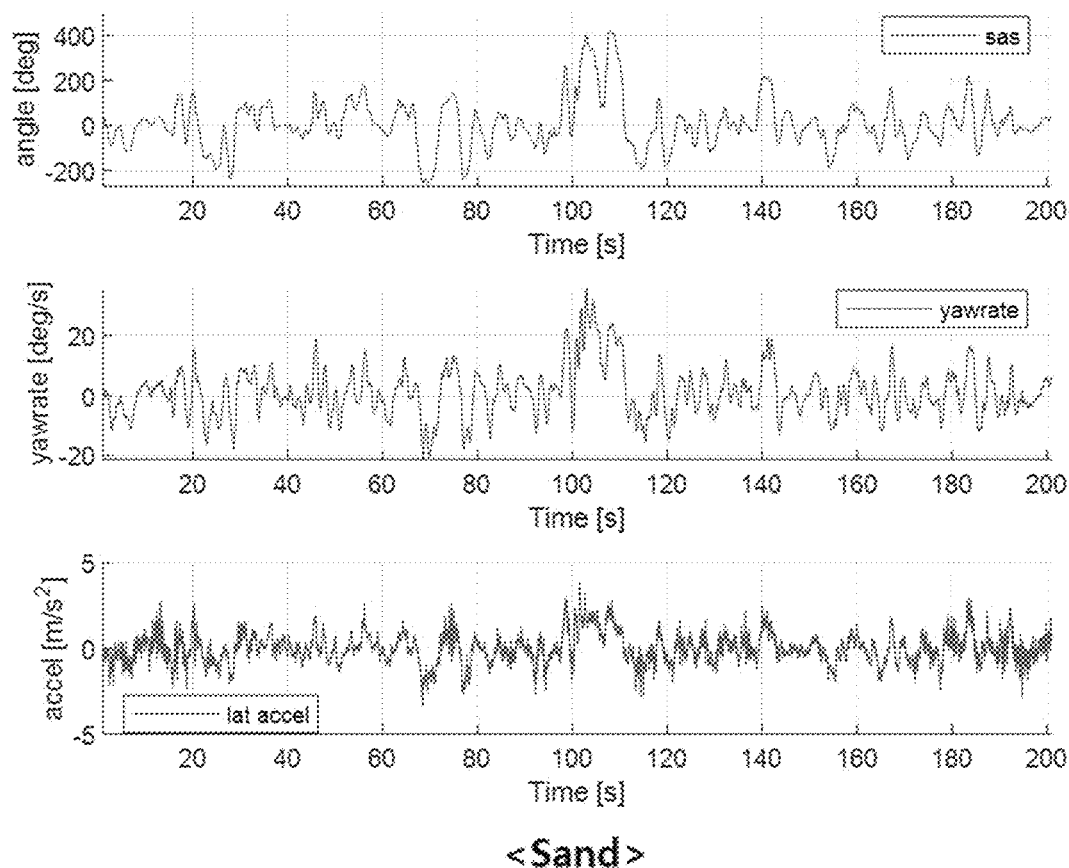

As illustrated in FIG. 6, the first classifier 154 may first classify the road surface using a support vector machine (SVM).

Since the SVM is a binary classifier, a plurality of pairs are obtained by matching one-to-one with a plurality of types of road surfaces, and learning is performed on the obtained plurality of pairs. That is, a pair may include two types of road surfaces.

The first classifier 154 may learn by comparing two types of road surfaces in the pair on a one-to-one basis, but perform learning on all of the plurality of pairs.

The first classifier 154 may score the pairs through a voting method, and classify the road surface based on the score. This is as illustrated in FIGS. 7A, 7B, 7C, and 7D.

That is, the first classifier 154 may primarily recognize the type of road surface.

The driving data obtainer 155 may obtain the wheel speed data and the longitudinal acceleration data through the driving information detector 130. The driving data obtainer 155 may perform CAN communication with the driving information detector 130.

This is because, as illustrated in FIGS. 8A, 8B, 8C, and 8D, the wheel speed and the longitudinal acceleration are important factors in movement in the longitudinal direction thereof.

The driving data obtainer 155 may also obtain driving data for a lateral movement through the driving information detector 130. That is, the driving data obtainer 155 may obtain the lateral acceleration data, the yaw rate data, and the steering angle data.

This is because, as illustrated in FIGS. 9A, 9B, 9C, and 9D, the lateral acceleration data, the yaw rate data, and the steering angle data also vary depending on the type of road surface.

The second feature vector device 156 may obtain the second feature vector based on the wheel speed data, the longitudinal acceleration data, the lateral acceleration data, the yaw rate data, and the steering angle data.

$$\text{Input} \begin{bmatrix} \overline{v}_{fl} \\ \overline{v}_{fr} \\ \overline{v}_{rr} \\ \overline{a}_x \\ \overline{\theta} \\ \overline{a}_y \\ \overline{a}_y \\ \overline{\psi} \end{bmatrix} \in R^{8n\times 1}$$

$v_i$ for i=fl, fr, rl, rr; wheel speed of each wheel
$\dot{V}_x$: longitudinal acceleration
$\theta$: Steering wheel angle
$\dot{V}_y$: lateral acceleration
$\psi$: yaw rate
$V_x$ symbol is the time-differentiated velocity of the longitudinal direction, and represents the longitudinal acceleration(ax).
$V_x$ symbol is the time-differentiated lateral velocity, which means lateral acceleration(ay symbol).
A wave symbol of each data means a vector of each data.

As illustrated in FIG. 10, the second feature vector device 156 may obtain samples of each data to obtain the second feature vector, and obtain the second feature vector by inputting the obtained samples of each data.

Figure 11A:
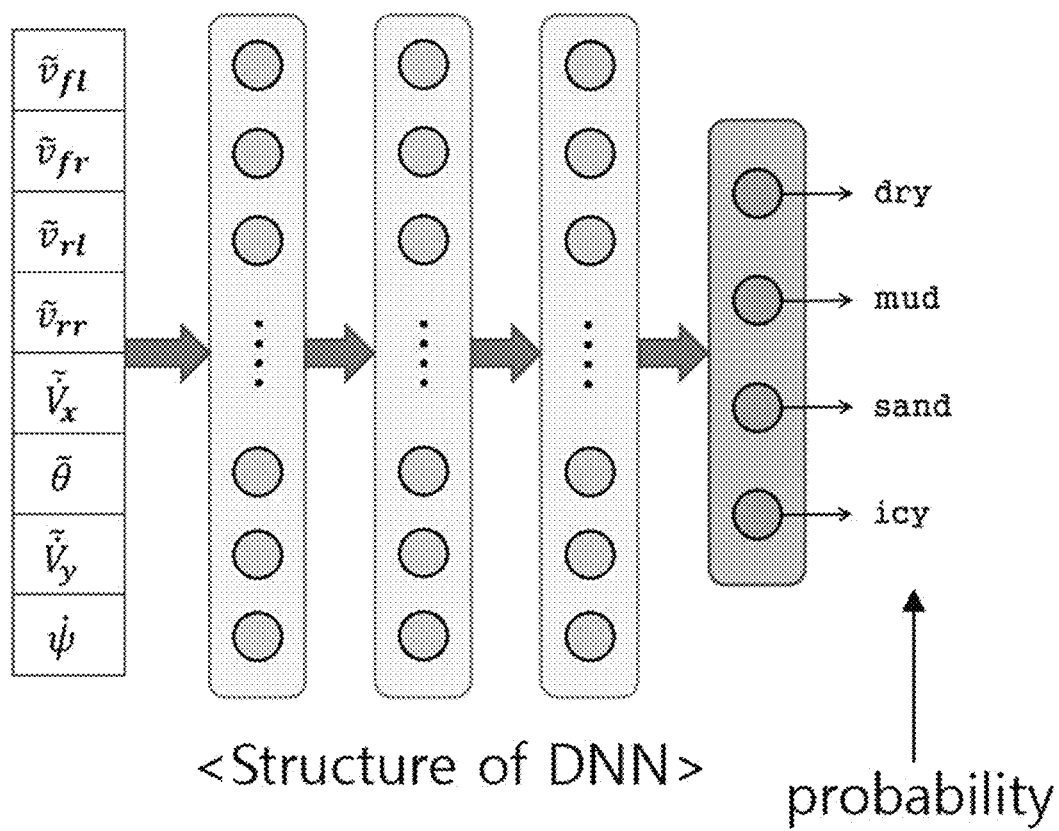
FIG. 11A is a view exemplarily illustrating a structure of a deep neural network (DNN) of a road surface recognition apparatus of a vehicle according to an exemplary embodiment of the present invention.
Figure 11B:
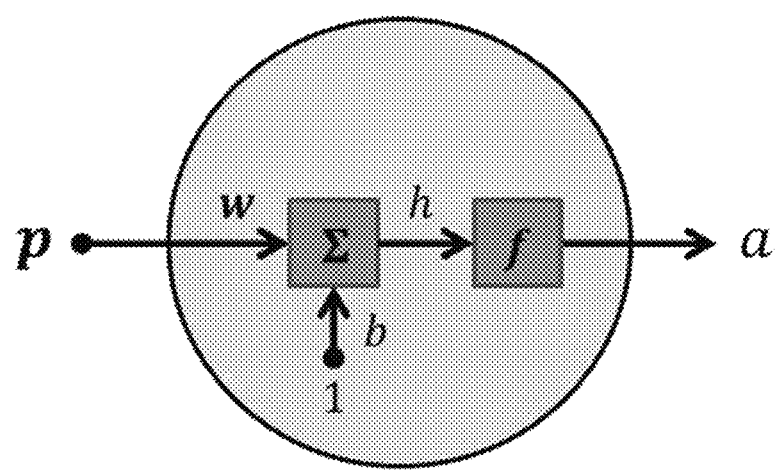
FIG. 11B is a view exemplarily illustrating a determination algorithm performed by each neuron in a hidden layer illustrated in FIG. 11A.
Figure 12A:
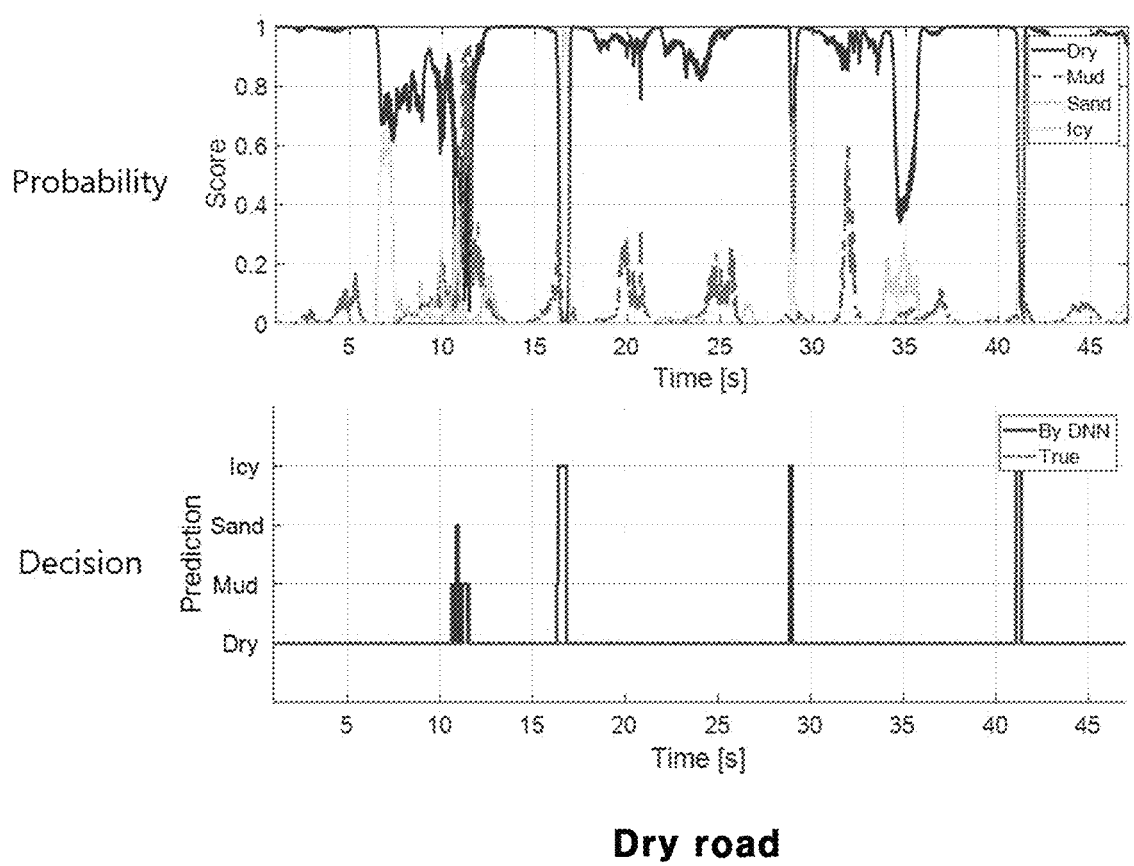
FIG. 12A, FIG. 12B, FIG. 12C, and FIG. 12D are views exemplarily illustrating probabilities for each type of road surface for driving data obtained by a road surface recognition apparatus of a vehicle according to an exemplary embodiment of the present invention.
Figure 12B:
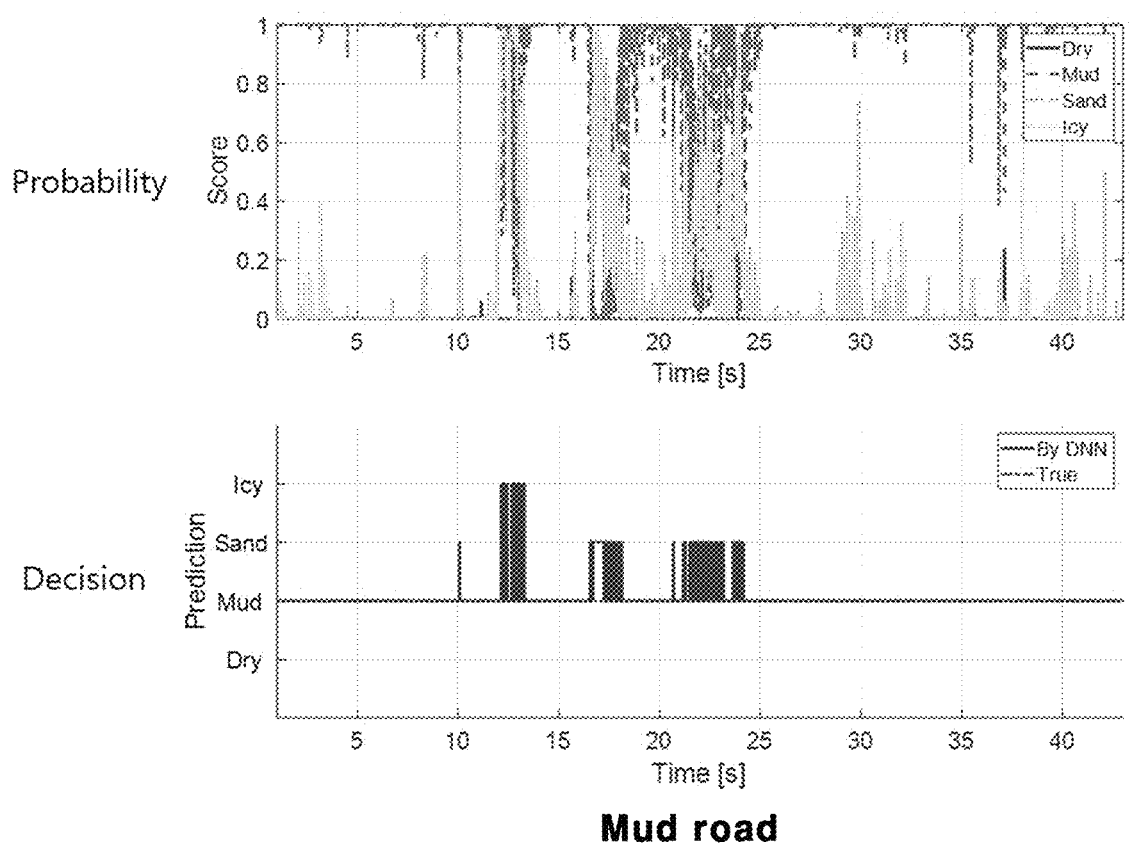
Figure 12C:
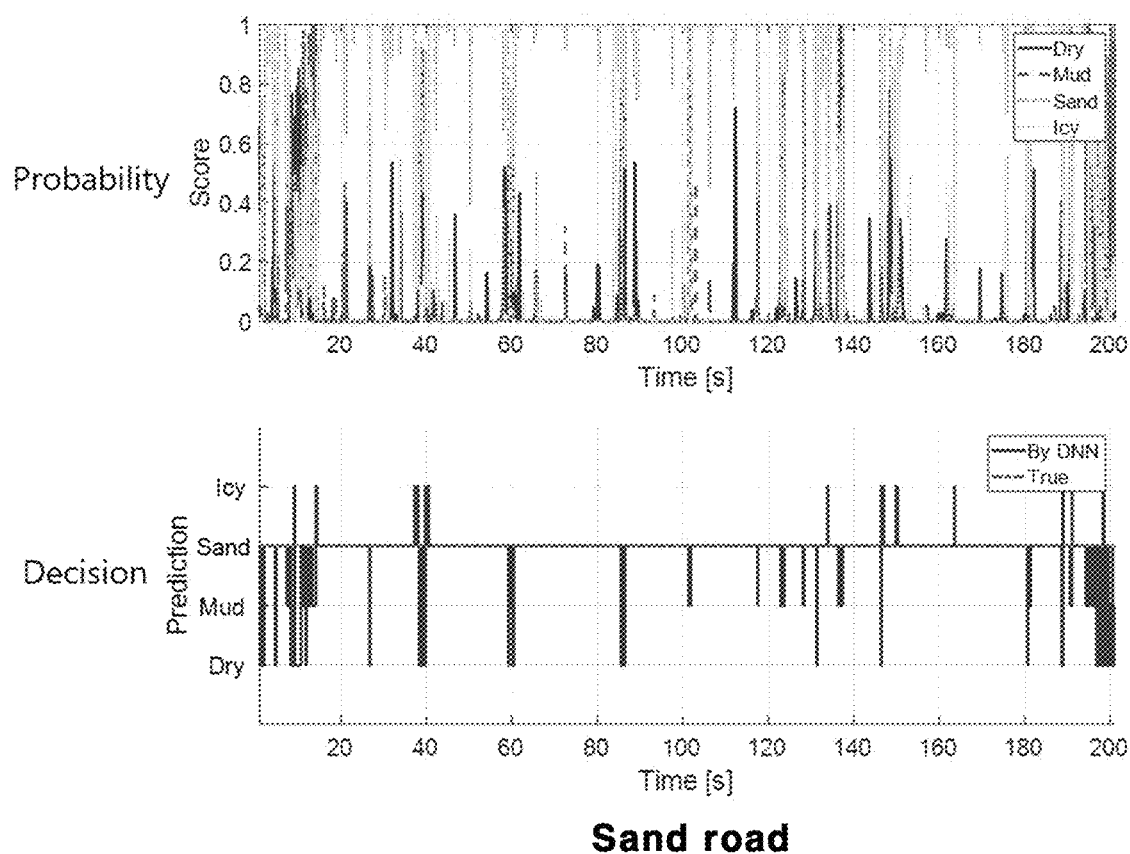
Figure 12D:
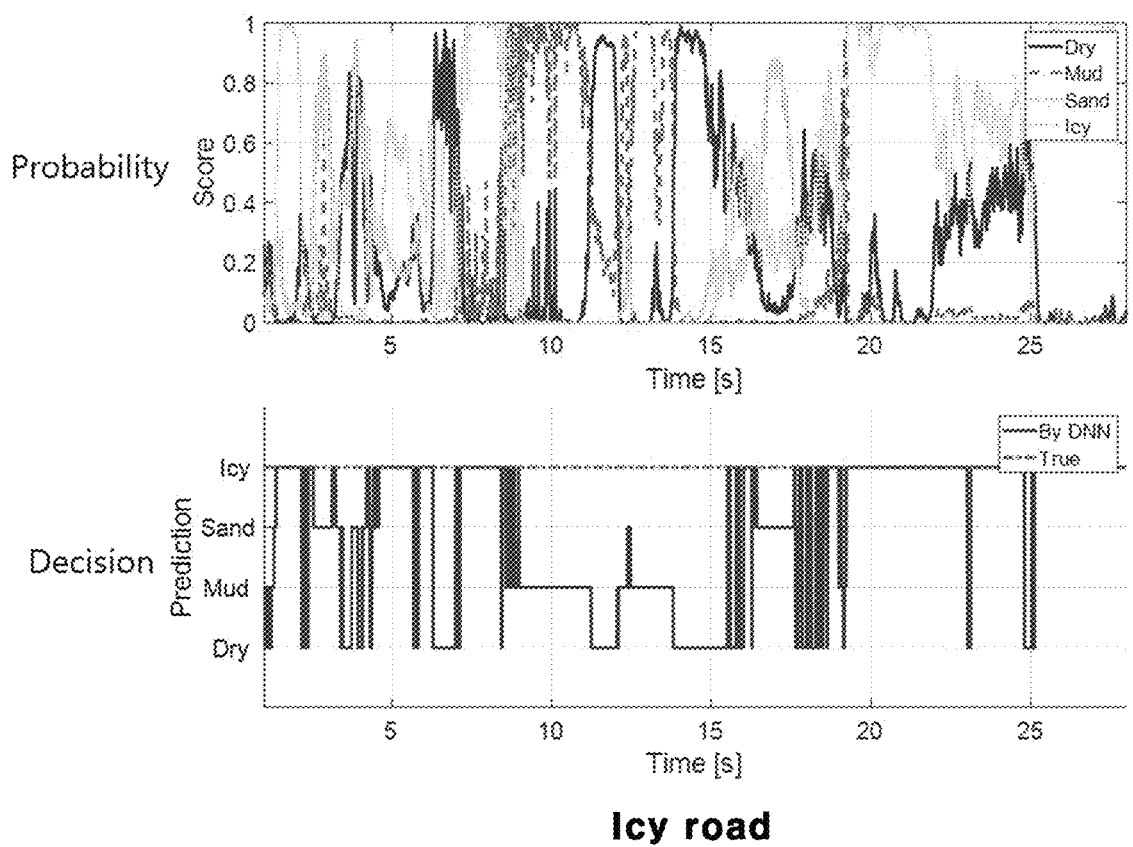

As illustrated in FIG. 11A and FIG. 11B, the second classifier 157 may classify the road surface in a second order using the second feature vector and a neural network. The second feature vector may be used as input data of the neural network.

FIG. 11A is a structure of a deep neural network (DNN), including an input layer, a plurality of hidden layers, and an output layer, and FIG. 11B is a determination algorithm performed by each neuron in the hidden layer.

The second classifier 157 may multiply an input data p by a weight w through a summing function and obtain a summed value h, and input the obtained value h to an activation function f to obtain an output a, and transmit the obtained output a to a next layer.

The input data p may be data output from a previous layer. The b is a constant of a linear function called bias.

$$\begin{cases} h = \Sigma(w_i p_i + b_i) \text{ for } i = 1, \ldots, 8n \\ a = \tan^{-1}(h) \end{cases}$$

The second classifier 157 may determine which type of road surface the input data belongs to.

At the present time, the neuron of the second classifier 157 may input the value h, which is generated by multiplying the input data and the weight, into the activation function f, and then determine where the provided data belongs based on the value output through the activation function f.

To train neurons, use an objective function E as follows.

$$E(\theta) = \frac{1}{n}\sum_{i=1}^{N} \|y_{correct} - y_{DNN}\|_2^2$$

where N is the number of training sets, yDNN is the neuron's output, and ycorrect is a difference between a predetermined output for the input data and an output of a model to be trained.

A training algorithm may use scaled conjugate gradient backpropagation.

As illustrated in FIGS. 12A, 12B, 12C, and 12D, the second classifier 157 may obtain a probability for each type of road surface for the driving data and classify the road surface based on the probability for each type.

The third classifier 158 may determine whether the detected longitudinal acceleration is less than a reference longitudinal acceleration based on the reference longitudinal acceleration data and the detected longitudinal acceleration data. When the detected longitudinal acceleration is less than the reference longitudinal acceleration, the third classifier 158 may determine the type of road surface based on the road surface information classified as primarily in the first classifier. When the detected longitudinal acceleration ax is equal to or greater than the reference longitudinal acceleration r, the third classifier 158 may determine the type of road surface based on the road surface information classified as secondary in the second classifier 157.

Here, the longitudinal acceleration value corresponding to the longitudinal acceleration data may be an absolute value.

Figure 13A:
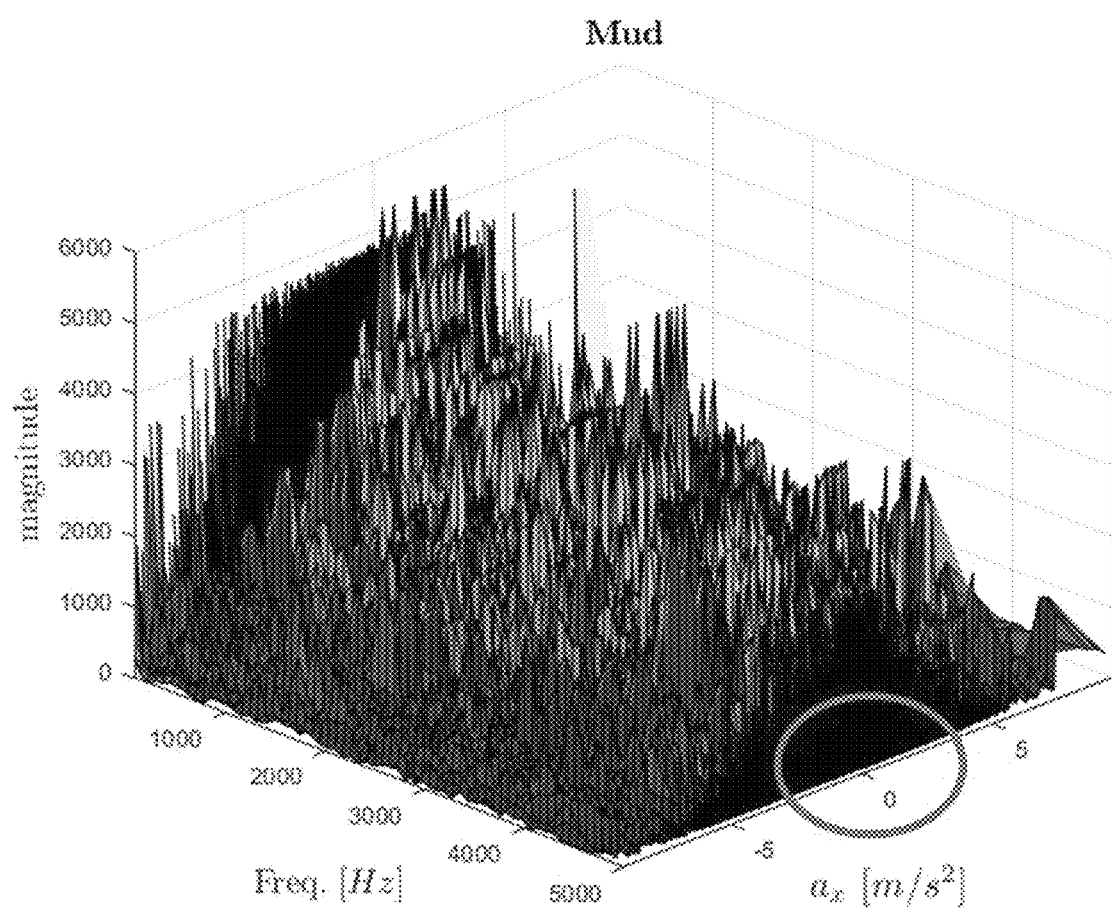
FIGS. 13A and 13B are views exemplarily illustrating acceleration and speed characteristics when a mud road is recognized by a road surface recognition apparatus of a vehicle according to an exemplary embodiment of the present invention.
Figure 13B:
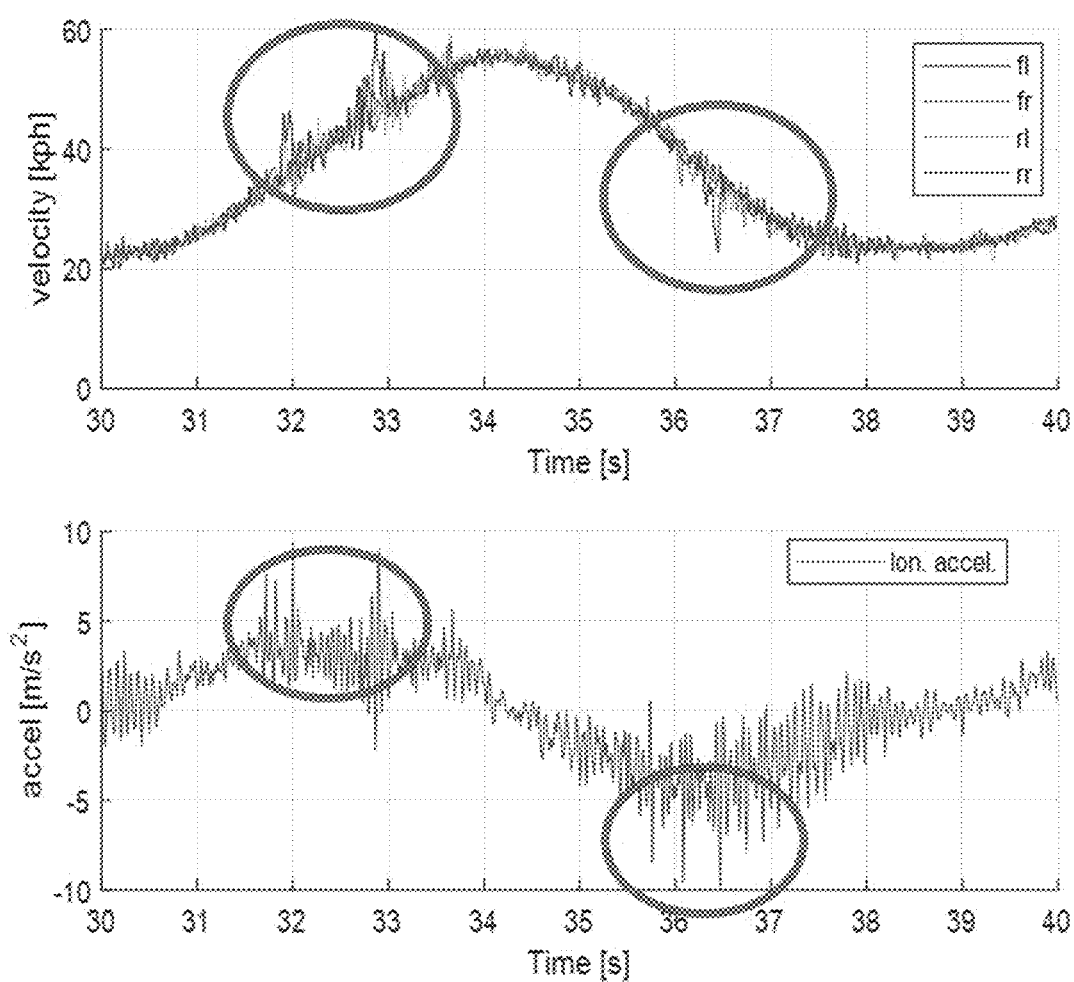

As illustrated in FIGS. 13A and 13B, in the case of the mud road, among the sound data, it may be seen that when the longitudinal direction acceleration of the vehicle 1 among the sound data is less than or equal to ±2 m/s², appearing the features of the road surface. Among the driving data, it may be seen that when the longitudinal acceleration of the vehicle 1 is equal to or greater than ±2 m/s², the tire slip occurs, revealing the features of the road surface.

The third classifier 158 may recognize the road surface based on equation 1 using an importance of the longitudinal acceleration.

$$\frac{a_{max} - a_x}{a_{max}} \cdot A + \frac{a_x}{a_{max}} \cdot B \qquad \text{Equation 1}$$

Where amax is a maximum longitudinal acceleration, A is the output from the sound detector 120, and B is the output from the driving information detector 130.

The lower the longitudinal acceleration, the higher the importance of the result determined as the sound data. The higher the longitudinal acceleration, the higher the importance on the result judged by the driving data detected by the driving information detector 130.

The road surface recognizer 159 may store the state transition information for the plurality of types of road surfaces.

It is possible to store the state transition information for the plurality of pairs of two types of road surfaces as the pair.

The road surface recognizer 159 may store information for the predetermined time period for determining two types of road surfaces forming the pair. Here, the information for the predetermined time period for determining the two types of road surfaces forming the pair may be different from each other.

Figure 14:
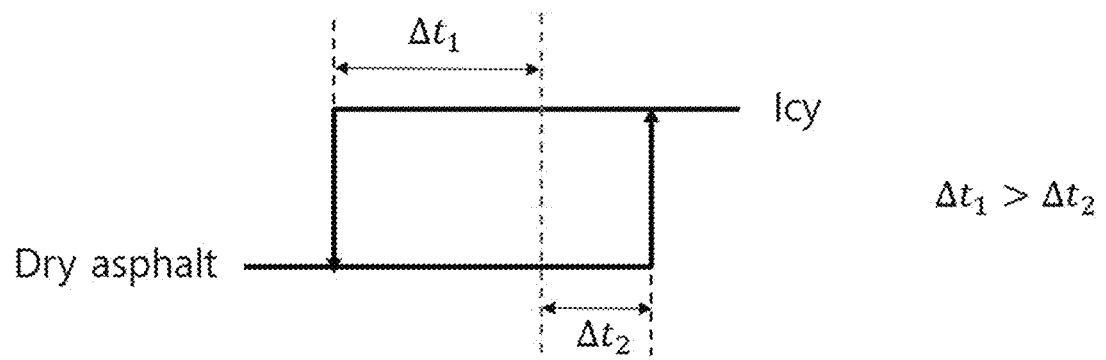
FIG. 14 is a view exemplarily illustrating hysteresis for a state transition for finally determining a road surface in a road surface recognition apparatus of a vehicle according to an exemplary embodiment of the present invention.

The road surface recognizer 159 may consider hysteresis in each state transition to recognize data noise and a false determination of the third classifier 158. This will be described with reference to FIG. 14.

In a state that the third classifier 158 determines that the type of road surface is the ice road, and when the result of determining the dry asphalt road surface continuously for a first predetermined time period Δt1 is input based on the state transition information for the dry asphalt road surface and the ice road surface, the road surface recognizer 159 may finally determine an ice road surface state.

In a state that the third classifier 158 determines that the type of road surface is the dry asphalt road, and when the result of determining the ice road surface continuously for a second predetermined time period Δt2 is input based on the state transition information for the dry asphalt road surface and the ice road surface, the road surface recognizer 159 may finally determine the ice road surface state.

The first predetermined time period may be longer than the second predetermined time period. For example, since the ice road surface is a more dangerous road surface than the dry asphalt road surface, a hysteresis time for final determination from the dry asphalt road surface to the ice asphalt road surface must be short.

At least one component may be added or deleted according to the performance of the components of the controller 150 illustrated in FIG. 3. Furthermore, it will be readily understood by those of ordinary skill in the art that the mutual positions of the components may be changed corresponding to the performance or structure of the system.

Figure 15:
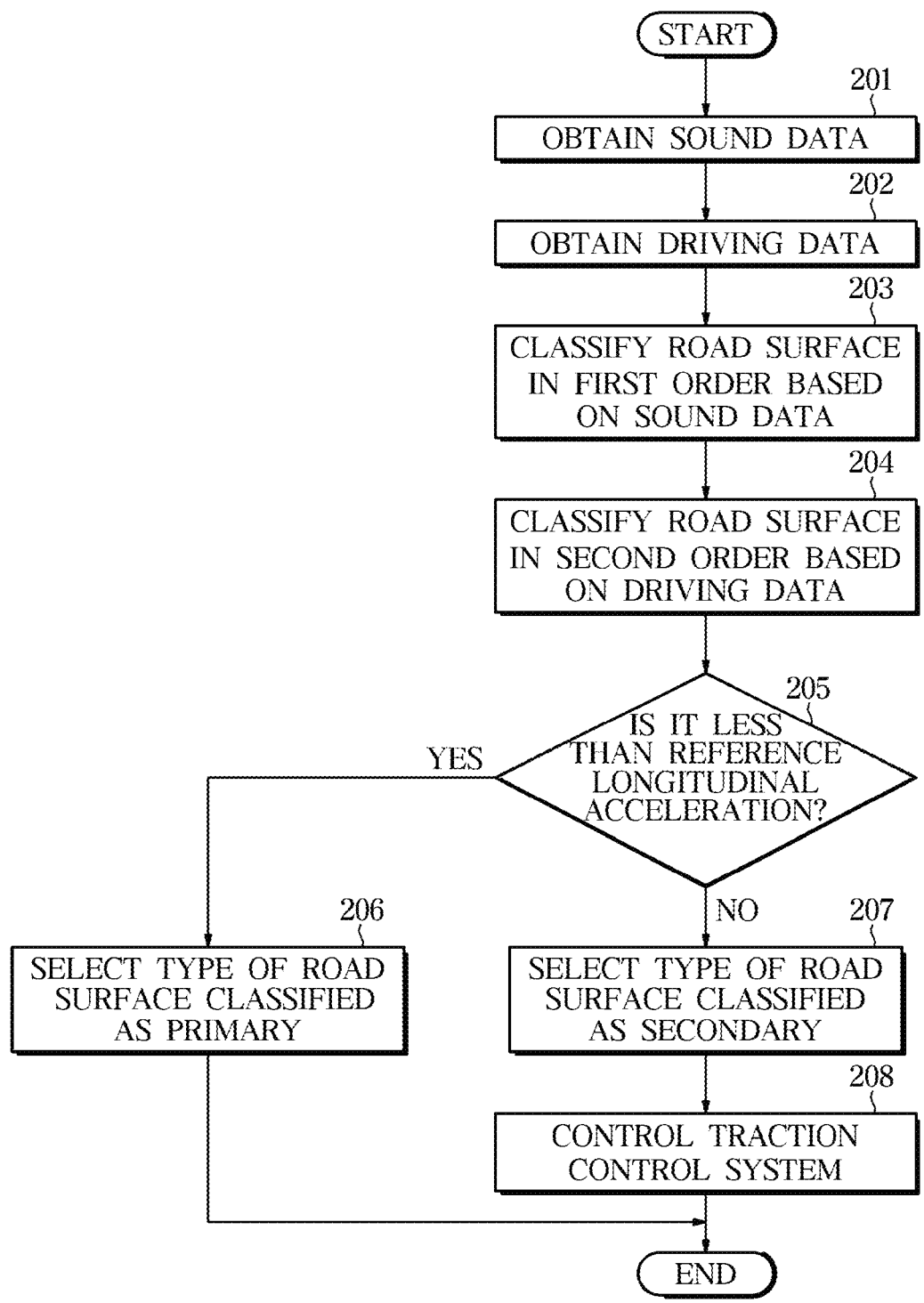
FIG. 15 is a flowchart illustrating a vehicle control according to an exemplary embodiment of the present invention.

FIG. 15 is a flowchart illustrating a vehicle control according to an exemplary embodiment of the present invention.

The vehicle 1 may obtain the sound data based on the sound signal received from the sound detector 130, convert the obtained sound data to the frequency, and obtain the sound data in the frequency domain (201). Here, the sound data for the received signal may be data in the time domain.

The vehicle 1 may obtain the driving data based on the driving signal received from the driving information detector 130 (202). Here, the driving data may include the wheel speed data, the longitudinal acceleration data, the steering angle data, the lateral acceleration data, and the yaw rate data for the plurality of wheels.

The vehicle 1 may obtain the driving speed of the vehicle 1 based on the wheel speeds detected by the plurality of wheel speed detectors. Furthermore, the vehicle 1 may obtain the driving speed of the vehicle 1 based on the acceleration of the vehicle 1. Furthermore, the vehicle 1 may obtain the driving speed of the vehicle 1 based on the plurality of wheel speeds and accelerations.

The vehicle 1 may obtain the first feature vector for the sound data, the longitudinal acceleration data, and the driving speed data for the frequency domain, and first recognize the road surface using the obtained first feature vector and a first classifier model.

Here, the first classifier model may include the SVM.

The vehicle 1 may obtain scores for dry asphalt roads and ice roads, scores for dry asphalt roads and mud roads, scores for dry asphalt roads and sand roads, scores for ice roads and mud roads, scores for ice roads and sand roads, and scores for mud roads and sand roads using the first classifier model, and classify the road surface firstly based on the highest score among the obtained scores (203).

Classifying the road surface in the first order here may include recognizing the type of road surface in the first order.

The vehicle 1 may obtain the driving data corresponding to the driving information related to the vehicle 1, obtain the second feature vector for the obtained driving data, and classify the road surface in a second order by use of the obtained second feature vector and a second classifier model (204).

Here, the driving data may include the wheel speed data, the longitudinal acceleration data, the steering angle data, the lateral acceleration data, and the yaw rate data for the plurality of wheels.

The second classifier model may include the neural network. Here, the neural network may be the DNN.

The vehicle 1 may obtain the probability for each type of road surface based on the driving data using the second classifier model, and may classify the road surface in the second order based on the probability for each type of road surface.

Classifying the road surface as the second order here may include recognizing the type of road surface as the second order.

The primary road surface classification and the secondary road surface classification are only expressions to clarify the configuration and are not related to the order of operation.

The vehicle 1 may determine whether the detected longitudinal acceleration is less than the reference longitudinal acceleration based on the detected longitudinal acceleration data and the reference longitudinal acceleration data (205). When the detected longitudinal acceleration is less than the reference longitudinal acceleration, the vehicle 1 may select the type of road surface classified as the primary (206). When the detected longitudinal acceleration ax is equal to or greater than the reference longitudinal acceleration r, the vehicle 1 may select the type of road surface classified as secondary (207).

Here, the longitudinal acceleration value corresponding to the longitudinal acceleration data may be the absolute value.

The vehicle 1 may finally recognize the type of road surface based on the selected type of road surface and state transition information. That is, when the type of road surface classified as primary is selected, the vehicle 1 may finally recognize the type of road surface based on the type of road surface and state transition information classified as primary. When the type of road surface classified as secondary is selected, the vehicle 1 may finally recognize the type of road surface based on the type of road surface and state transition information classified as secondary.

The state transition information may include state transition information for the first pair for dry asphalt road and ice road, state transition information for the second pair for dry asphalt road and mud road, state transition information for the third pair for dry asphalt road and sand road, state transition information for the fourth pair for the ice road and the mud road, state transition information for the fifth pair for the ice road and the sand road, and state transition information for the sixth pair for the mud road and the sand road, and may further include predetermined time information for recognizing each type of road surface in each pair.

When the type of road surface is recognized, the vehicle 1 may obtain the friction coefficient corresponding to the recognized type of road surface, obtain the optimum wheel slip based on the obtained friction coefficient, and control the traction control system based on the obtained wheel slip (208).

When obtaining wheel slip, the vehicle 1 may obtain the longitudinal slip ratio and the longitudinal traction force based on the wheel speed data, the longitudinal acceleration data, and the friction coefficient.

The vehicle 1 may control the brake and the engine torque of each wheel and adjust the steering angle based on the wheel slip.

According to the exemplary embodiment of the present invention, the present invention may accurately recognize the type of road surface by use of the relationship between the sound and acceleration between the vehicle and the road surface and the tire slip.

Furthermore, since the present invention can recognize black ice causing a fatal safety accident, it is possible to reduce an accident rate due to the black ice and promote a driver's safe driving.

This is because the result of identifying the type of road surface may be used for vehicle safety systems. For example, systems related to vehicle braking such as smart cruise control (SCC) or autonomous emergency brake (AEB) may be advanced technology by securing more safety distances depending on the type of road surface, and even for emergency avoidance control such as autonomous emergency steering (AES), a steering angle may be determined according to the road surface.

The present invention may improve the quality and marketability of the vehicle, and further improve user satisfaction, improve user convenience, reliability and safety, and secure product competitiveness.

The disclosed exemplary embodiments may be implemented in a form of a recording medium storing computer-executable instructions that are executable by a processor. The instructions may be stored in a form of a program code, and when executed by a processor, the instructions may generate a program module to perform operations of the disclosed exemplary embodiments. The recording medium may be implemented non-transitory as a non-transitory computer-readable recording medium.

The non-transitory computer-readable recording medium may include all types of recording media storing commands which may be interpreted by a computer. For example, the non-transitory computer-readable recording medium may be, for example, ROM, RAM, a magnetic tape, a magnetic disc, flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A road surface recognition apparatus comprising:
a memory configured to store one or more instructions; and
a processor configured to execute the one or more instructions stored in the memory,
wherein the instructions, when executed by the processor, cause the processor to:
obtain sound data for a sound detected by a sound detecting sensor;
obtain driving data of a vehicle for driving information detected by a driving information detecting sensor; and
recognize a type of road surface according to the sound data and the driving data, and
wherein the processor is further configured to:
transform the obtained sound data into sound data in a frequency domain;
obtain a first feature vector using longitudinal acceleration data and driving speed data among the driving data, and the sound data in the frequency domain;
classify a first type of the road surface in a first order using the first feature vector and a first classifier model;
obtain a second feature vector according to a plurality of wheel speed data, the longitudinal acceleration data, steering angle data, lateral acceleration data, and yaw rate data among the driving data;
classify a second type of the road surface in a second order using the second feature vector and a second classifier model; and
determine the type of the road surface by selecting at least one of the first type of the road surface and the second type of the road surface based on the longitudinal acceleration data and reference longitudinal acceleration data.

2. The road surface recognition apparatus according to claim 1, wherein the processor is configured to:
according to the longitudinal acceleration data and the reference longitudinal acceleration data, in a response to the longitudinal acceleration being less than the reference longitudinal acceleration, select the first type of the road surface, and
in a response to the longitudinal acceleration being greater than or equal to the reference longitudinal acceleration, select the second type of the road surface.

3. The road surface recognition apparatus according to claim 1, the processor is configured to:
recognize the type of the road surface according to the selected type of the road surface and state transition information for a remaining type of the road surface.

4. The road surface recognition apparatus according to claim 1,
wherein the first classifier model includes a support vector machine; and
wherein the second classifier model includes a deep neural network.

5. The road surface recognition apparatus according to claim 1, wherein the processor is configured to receive the sound data through an Electronic Stability Control (ESC) system.

6. A vehicle comprising:
a sound detecting sensor;
a driving information detecting sensor; and
a controller electrically connected to the sound detecting sensor and the driving information detecting sensor and configured to:
obtain sound data for a sound detected by the sound detecting sensor,
obtain driving data for driving information detected by the driving information detecting sensor,
recognize a type of road surface according to the obtained sound data and the obtained driving data, and
control a driving force of a vehicle according to information related to the recognized type of the road surface,
wherein the controller is configured to:
transform the obtained sound data into sound data in a frequency domain;
obtain a first feature vector using longitudinal acceleration data and driving speed data among the driving data, and the sound data in the frequency domain;
classify a first type of the road surface in a first order using the first feature vector and a first classifier model;
obtain a second feature vector according to a plurality of wheel speed data, the longitudinal acceleration data, steering angle data, lateral acceleration data, and yaw rate data among the driving data;
classify a second type of the road surface in a second order using the second feature vector and a second classifier model; and
determine the type of the road surface by selecting at least one of the first type of the road surface and the second type of the road surface based on the longitudinal acceleration data and reference longitudinal acceleration data.

7. The vehicle according to claim 6, wherein the controller is configured to:
according to the longitudinal acceleration data and the reference longitudinal acceleration data, in a response to the longitudinal acceleration being less than the reference longitudinal acceleration, select the first type of the road surface, and
in a response to the longitudinal acceleration being greater than or equal to the reference longitudinal acceleration, select the second type of the road surface.

8. The vehicle according to claim 6, wherein the controller is configured to:
recognize the type of the road surface according to the selected type of the road surface and state transition information for a remaining type of the road surface.

9. The vehicle according to claim 6,
wherein the first classifier model includes a support vector machine; and
wherein the second classifier model includes a deep neural network.

10. The vehicle according to claim 6, wherein the sound detecting sensor is mounted on a right rear side of a vehicle body.

11. The vehicle according to claim 6, further including:
a traction control system configured to control the driving force in a response to a control command of the controller.

12. The vehicle according to claim 6, wherein the controller is configured to:
obtain a friction coefficient corresponding to the information related to the recognized type of the road surface, and
control an operation of at least one of a brake and an engine based on the obtained friction coefficient.

13. A method of controlling a vehicle, the method comprising:
obtaining, by a controller, sound data for a sound detected by a sound detecting sensor while driving;

obtaining, by the controller, driving data of the vehicle for driving information detected by a driving information detecting sensor;

recognizing, by the controller, a type of road surface according to the obtained sound data and the obtained driving data; and controlling, by the controller, a traction control system according to information related to the recognized type of the road surface, wherein the controller is further configured to:
- transform the obtained sound data into sound data in a frequency domain;
- obtain a first feature vector using longitudinal acceleration data and driving speed data among the driving data, and the sound data in the frequency domain;
- classify a first type of the road surface in a first order using the first feature vector and a first classifier model;
- obtain a second feature vector according to a plurality of wheel speed data, the longitudinal acceleration data, steering angle data, lateral acceleration data, and yaw rate data among the driving data;
- classify a second type of the road surface in a second order using the second feature vector and a second classifier model; and determine the type of the road surface by selecting at least one of the first type of the road surface and the second type of the road surface based on the longitudinal acceleration data and reference longitudinal acceleration data.

* * * * *